US009668319B2

(12) United States Patent
Lee et al.

(10) Patent No.: US 9,668,319 B2
(45) Date of Patent: May 30, 2017

(54) LIGHTING SYSTEM AND CONTROL METHOD THEREOF

(71) Applicant: LG ELECTRONICS INC., Seoul (KR)

(72) Inventors: Jaemyoung Lee, Seoul (KR); Hyosuk Kim, Seoul (KR); Inhwan Ra, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/643,003

(22) Filed: Mar. 10, 2015

(65) Prior Publication Data

US 2015/0289345 A1 Oct. 8, 2015

(30) Foreign Application Priority Data

Apr. 4, 2014 (KR) ........................ 10-2014-0040709
Dec. 30, 2014 (KR) ........................ 10-2014-0193973

(51) Int. Cl.
| H05B 37/02 | (2006.01) |
| G06F 3/00 | (2006.01) |
| G06F 3/01 | (2006.01) |
| G02B 27/01 | (2006.01) |
| G06F 3/147 | (2006.01) |
| G09G 3/34 | (2006.01) |

(52) U.S. Cl.
CPC ....... H05B 37/0218 (2013.01); G02B 27/017 (2013.01); G06F 3/005 (2013.01); G06F 3/013 (2013.01); H05B 37/0272 (2013.01); G02B 2027/014 (2013.01); G02B 2027/0138 (2013.01); G06F 3/147 (2013.01); G09G 3/3406 (2013.01); G09G 2360/144 (2013.01); G09G 2360/16 (2013.01)

(58) Field of Classification Search
CPC ............. H04N 5/2353; H04N 13/0007; H04N 13/0033; H04N 13/004; H04N 13/026; H04N 13/0431; H04N 13/0434; H04N 13/0438; H04N 13/0454; H04N 13/0497; H04N 2213/002; H04N 2213/008; H04N 21/4318; H04N 7/15; H05B 37/0227
See application file for complete search history.

(56) References Cited

U.S. PATENT DOCUMENTS

2012/0300011 A1  11/2012  Moletti et al.

FOREIGN PATENT DOCUMENTS

| JP | H 11-133937 | 5/1999 |
| JP | 2008-085548 A | 4/2008 |
| JP | 2009-087834 A | 4/2009 |
| JP | 2013-146557 | 8/2013 |

(Continued)

OTHER PUBLICATIONS

European Search Report dated Jul. 28, 2015 issued in Application No. 15158286.3.

(Continued)

Primary Examiner — Monica C King
(74) Attorney, Agent, or Firm — KED & Associates, LLP

(57) ABSTRACT

The present invention relates to a lighting device including a radio communication unit for communicating with at least one device to receive an image of a space from the device, a light-emitting unit including at least one light-emitting element for providing light to the space, and a controller for controlling the light-emitting unit on the basis of an illuminance value calculated on the basis of the image.

21 Claims, 21 Drawing Sheets

(56) References Cited

FOREIGN PATENT DOCUMENTS

| JP | 2014-232634 | 12/2014 |
|---|---|---|
| KR | 10-2011-0064220 | 6/2011 |
| KR | 10-2012-0079237 A | 7/2012 |
| KR | 10-1453806 | 10/2014 |
| KR | 10-2014-0140867 | 12/2014 |
| WO | WO 2013/054221 A1 | 4/2013 |
| WO | WO 2013/136822 A1 | 9/2013 |

OTHER PUBLICATIONS

Korean Office Action dated Aug. 31, 2015 issued in Application No. 10-2014-0040709.
Korean Office Action dated Feb. 15, 2016 issued in Application No. 10-2014-0193973.
Korean Notice of Allowance dated Feb. 14, 2017 issued in Application No. 10-2014-0040709.

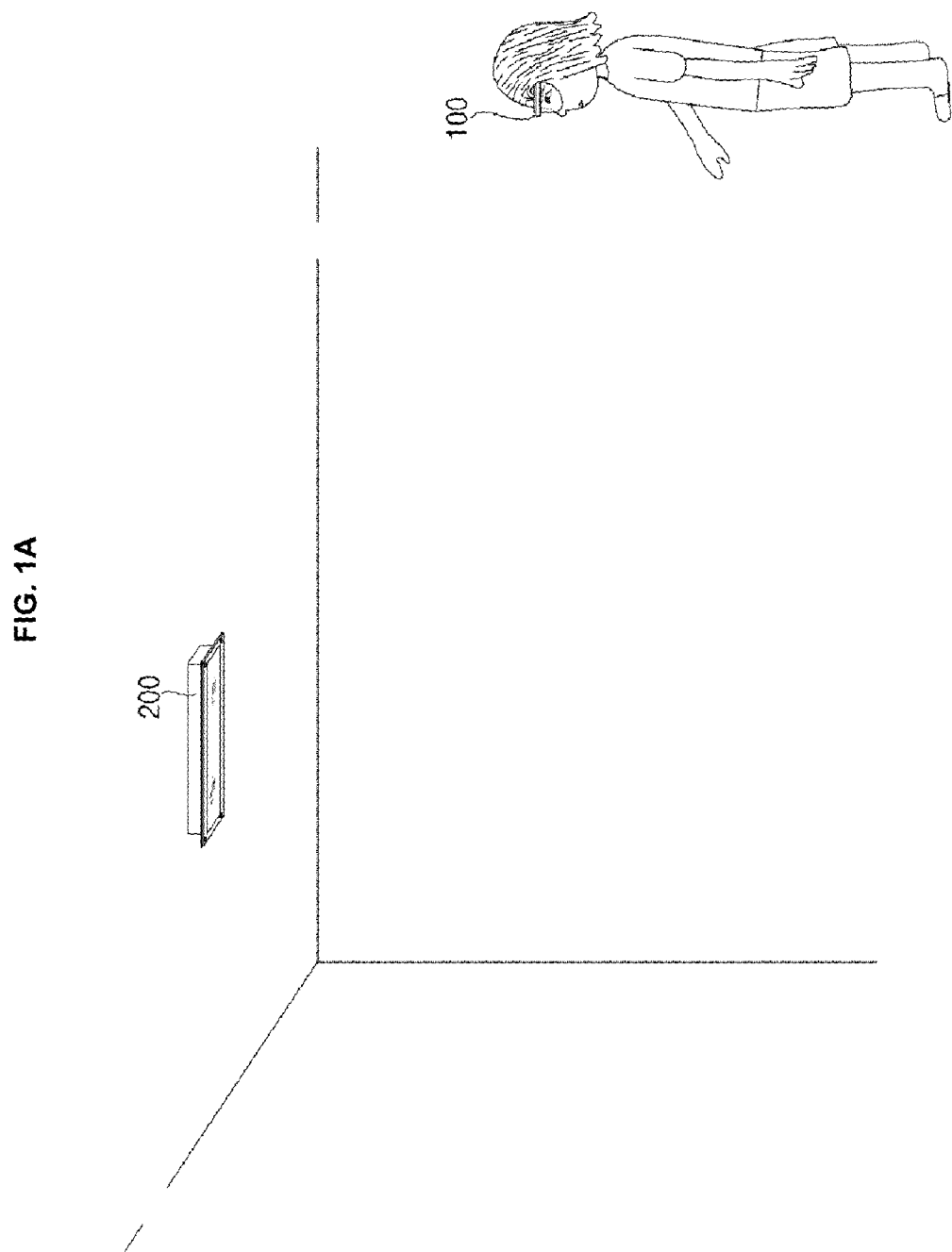

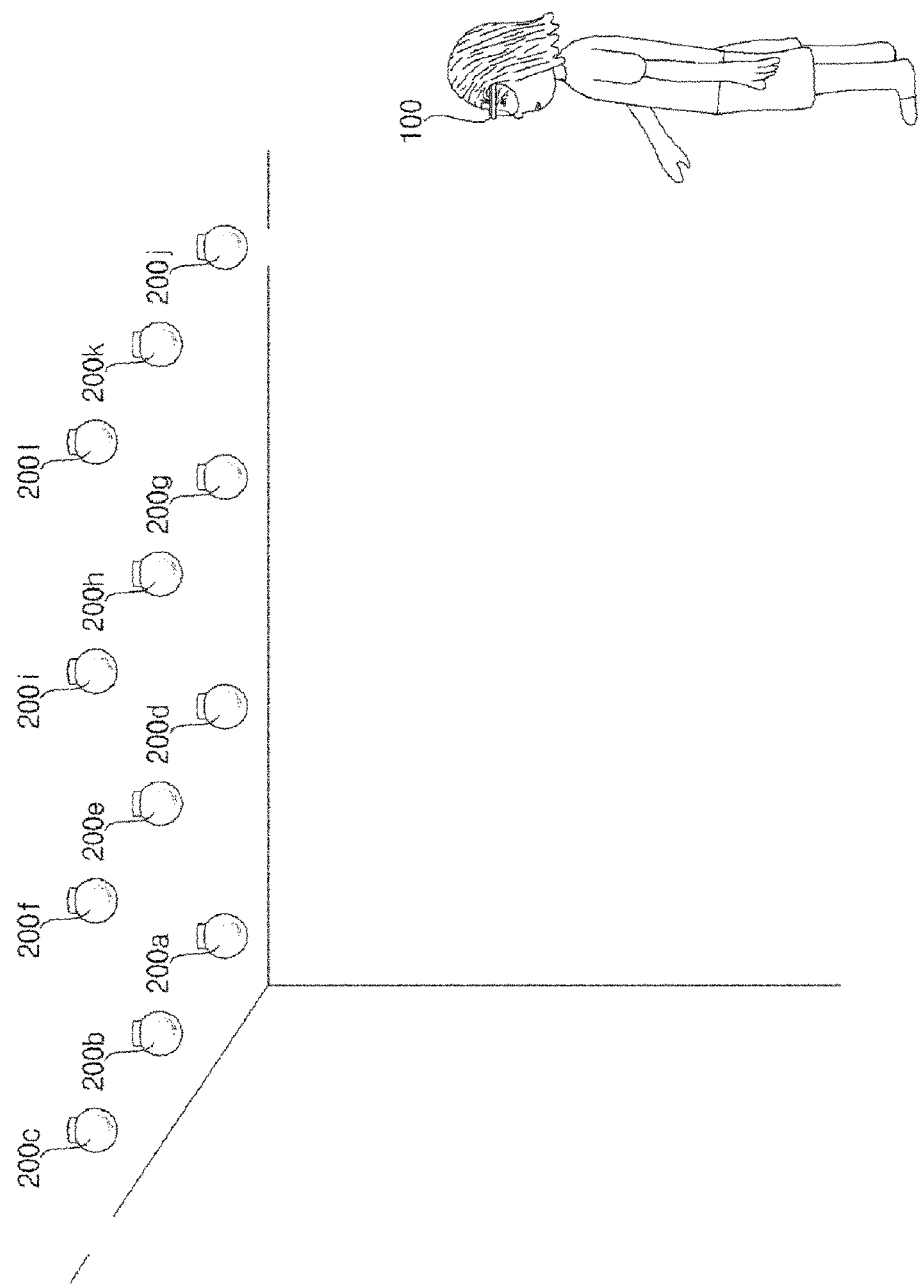

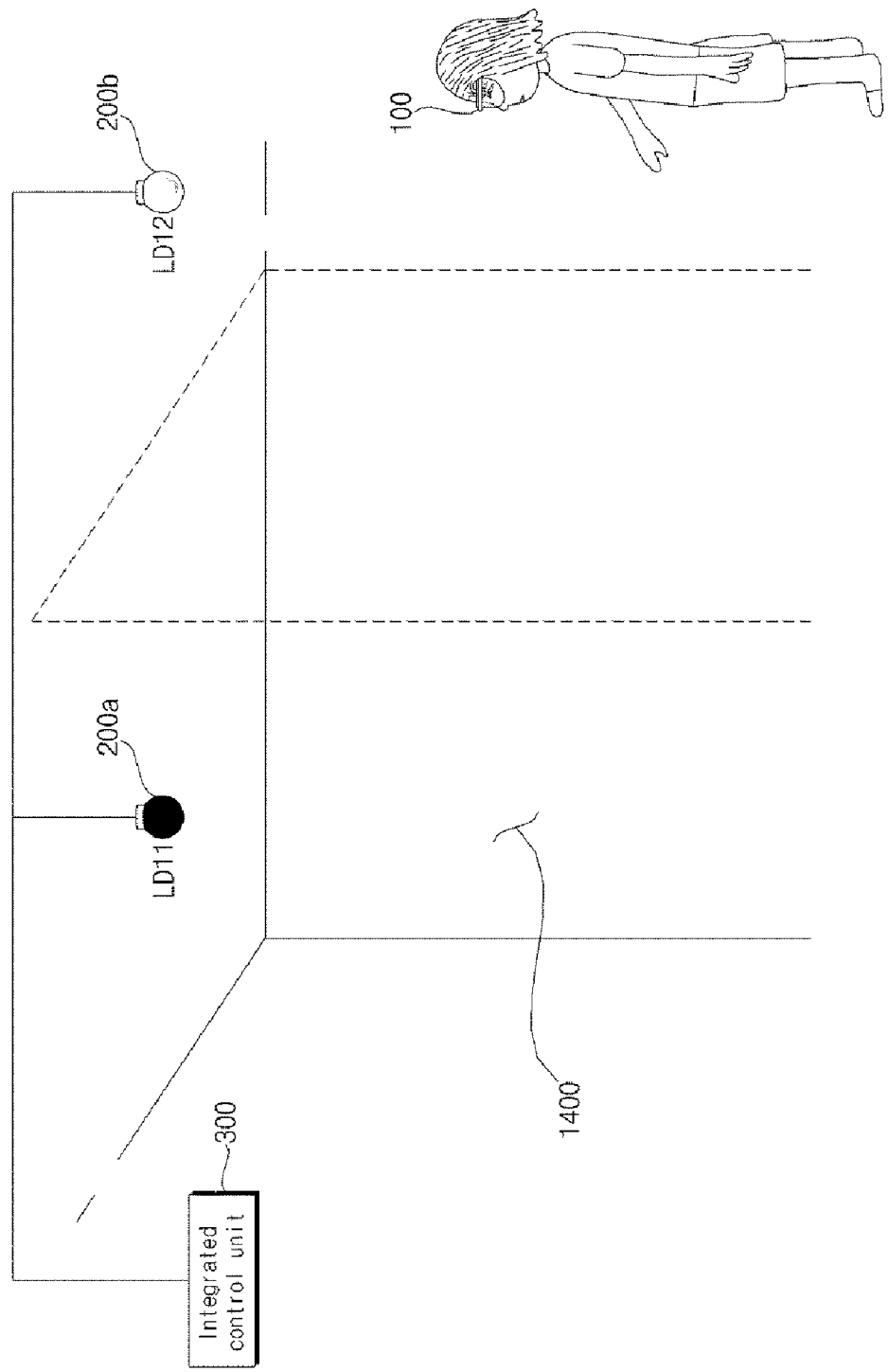

LIGHTING SYSTEM AND CONTROL METHOD THEREOF

CROSS-REFERENCE TO RELATED APPLICATION

This application claims the priority benefit of Korean Patent Application No. 10-2014-0040709, filed on Apr. 4, 2014, and Korean Application No. 10-2014-0193973 filed on Dec. 30, 2014, in the Korean Intellectual Property Office, the disclosures of which are incorporated herein by reference.

BACKGROUND OF THE INVENTION

1. Field of the Invention

The present invention relates to a lighting system for controlling lighting on the basis of digital images acquired from a device and an operation method thereof.

2. Description of the Related Art

The lighting industry is continuously developing and various studies have been done on light sources, emission methods, driving methods and efficiency improvement in association with the lighting industry.

Incandescent lamps, discharge lamps, fluorescent lamps and the like are used as light sources for lighting. Lighting employing these light sources is used for various purposes such as home use, landscaping and industrial use. From among these light sources, resistive light sources such as the incandescent lamp have low efficiency and generate heat. In addition, the discharge lamp is expensive and requires a high voltage and the fluorescent lamp has a problem of environmental pollution due to use of mercury.

To solve these problems of the light sources, there is a growing interest in light emitting diode (LED) lighting. Particularly, LED lighting has advantages of energy efficiency, color variety, autonomy of design and the like.

The LED is a semiconductor device that emits light when a voltage is applied thereto in the forward direction. The LED has a long life, low power consumption and electrical, optical and physical characteristics suited to mass production. Accordingly, LEDs are rapidly replacing incandescent lamps and the fluorescent lamps.

Meanwhile, smart technology of implementing a ubiquitous environment in homes has recently come into the spotlight. The ubiquitous environment enables computing using home networking and Internet information electronic appliances based on wired/wireless communication digital information devices through at any device, any time and any place.

By combining the smart technology and lighting, technological progress has been achieved to control lighting using a terminal while lighting and the device are connected through communication. To control lighting using a terminal however, a user needs to input a command for lighting control to the terminal.

SUMMARY OF THE INVENTION

Therefore, the present invention has been made in view of the above problems, and it is an object of the present invention to provide a lighting system for controlling lighting on the basis of an image acquired by a device and an operation method thereof.

In accordance with an aspect of the present invention, the above and other objects can be accomplished by the provision of a lighting device, including: a radio communication unit for communicating with at least one device and for receiving an image of a space from the device; a light-emitting unit including at least one light-emitting element for providing light to the space; and a controller for controlling the light-emitting unit on the basis of an illuminance value calculated on the basis of the image.

In accordance with an aspect of the present invention, there is provided a lighting device, including: a radio communication unit for communicating with at least one device to receive a radio control signal from the device; a light-emitting unit including at least one light-emitting element; and a controller for controlling the light-emitting unit on the basis of the radio control signal, wherein the radio control signal is based on an illuminance value calculated on the basis of an image of a space, generated in the device.

In accordance with an aspect of the present invention, there is provided a lighting system, including: a plurality of lighting devices respectively having unique IDs; and an integrated control unit including an integrated controller configured to communicate with at least one device to receive an image of a space from the device, to measure individual luminance values of pixels of the image on the basis of the image, to calculate an average luminance value on the basis of the individual luminance values, and to control a first lighting device indicated on the image, from among the plurality of lighting devices, on the basis of an illuminance value corresponding to the average luminance value.

In accordance with an aspect of the present invention, there is provided a lighting system, including: a plurality of lighting devices respectively having unique IDs; and an integrated control unit for communicating with at least one device to receive a radio control signal from the device and controlling a first lighting device on the basis of the radio control signal, wherein the radio control signal is based on an illuminance value corresponding to an average luminance value calculated on the basis of individual luminance values of pixels of an image of a space, generated in the device.

According to at least one embodiment of the present invention, the following advantages are obtained.

Firstly, the lighting system according to embodiments of the present invention can control lighting on the basis of an image acquired through a camera included in a device. Accordingly, active lighting control is achieved.

Secondly, since lighting is controlled on the basis of a digital image acquired according to gaze of a user, brightness of light provided to a space at which the user gazes can be controlled.

Thirdly, the lighting system according to embodiments of the present invention actively controls lighting in response to an acquired image. Accordingly, the present invention improves user convenience.

The effects of the present invention are not limited to the above-described effects and other effects which are not described herein will become apparent to those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B illustrate environments in which lighting systems according to embodiments of the present invention are used;

FIGS. 14A and 14B are views for explaining operations of the lighting systems according to the third and fourth embodiments of the present invention.

DETAILED DESCRIPTION OF THE PREFERRED EMBODIMENTS

Figure 2:
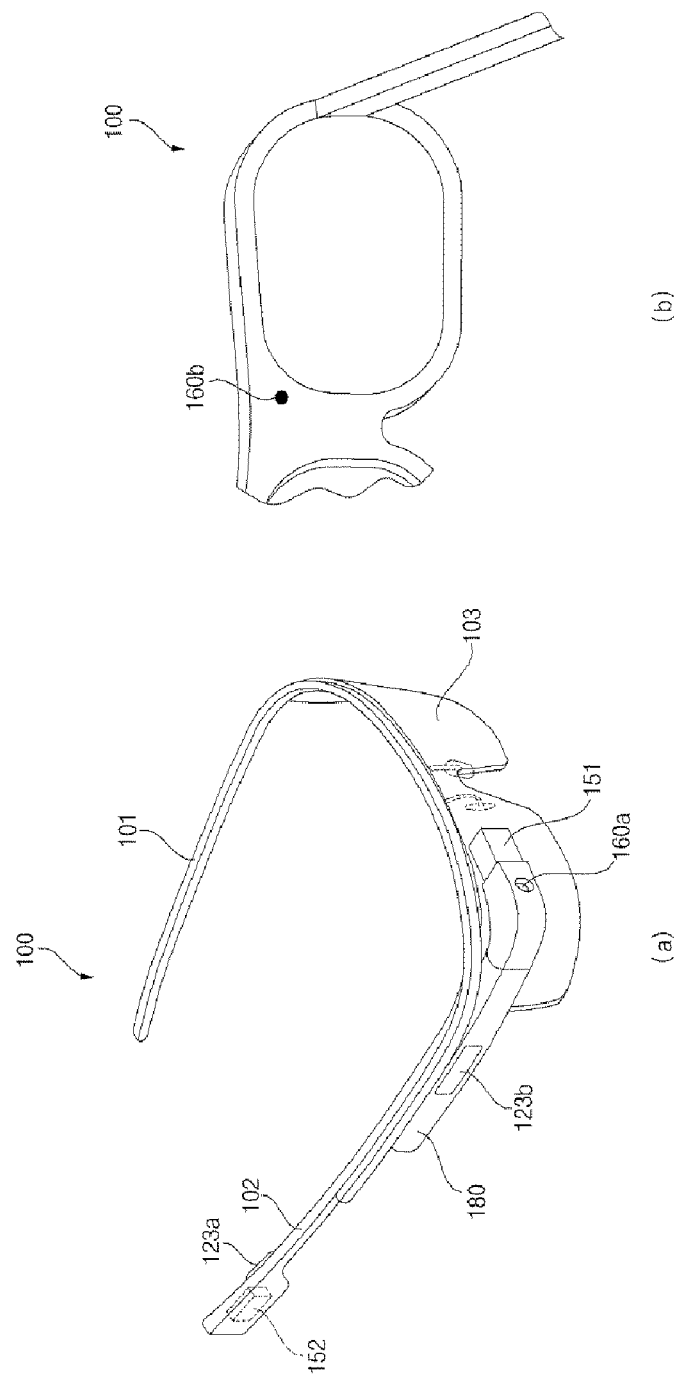
FIG. 2 illustrates a wearable device according to an embodiment of the present invention.

The present invention will now be described in more detail with reference to the attached drawings. The terms "module" and "unit" used to signify components are used herein to aid in understanding of the components and thus they should not be considered as having specific meanings or roles. Accordingly, the terms "module" and "unit" may be used interchangeably. In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto. It should be understood that there is no intent to limit the invention to the particular forms disclosed. On the contrary, the invention is to cover all modifications, equivalents, and alternatives falling within the spirit and scope of the invention as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It will be understood that when an element is "connected" or "coupled" to another element in the following description, it can be directly connected or coupled to the other element or intervening elements may be present therebetween. In contrast, when an element is "directly connected" or "directly coupled" to another element, there are no intervening elements present.

The singular forms are intended to include the plural forms as well, unless context clearly indicates otherwise.

It will be further understood that the terms "include" or "have" when used in this specification, specify the presence of stated features, regions, integers, steps, operations, elements, and/or components, but do not preclude the presence or addition of one or more other features, regions, integers, steps, operations, elements, components, and/or groups thereof.

In the drawings, dimensions of layers are exaggerated, omitted or schematically illustrated for clarity and convenience of description. In addition, dimensions of constituent elements do not entirely reflect actual dimensions thereof.

In the specification, a device is assumed as a glass type wearable device 100. However, the device is not limited thereto. The device 100 refers to an electronic device.

In the specification, an occupant and a user refer to persons who hold or wear the device 100 and are located in an indoor space in which a lighting device 200 is installed and may be used interchangeably.

FIGS. 1A and 1B illustrate environments in which lighting systems according to embodiments of the present invention are used.

Referring to FIG. 1A, the lighting system of an embodiment of the present invention includes the device 100 and the lighting device 200. Here, the device 100 may include a wearable device.

The device 100 includes at least one camera. The device 100 acquires at least one image using the camera. The device 100 communicates with the lighting device 200. The device 100 transmits the image to the lighting device 200.

The lighting device 200 communicates with the device 100. The lighting device 200 receives at least one image from the device 100. The lighting device 200 controls on/off, illuminance, color, color temperature, dimming and the like of lighting.

Referring to FIG. 1B, a lighting system according to another embodiment of the present invention includes the device 100, an integrated control unit and a plurality of lighting devices 200 (200a to 200l). While the number of lighting devices is 12 in FIG. 1B, the number of lighting devices is not limited thereto.

The device 100 includes at least one camera. The device 100 acquires at least one image using the camera. The device 100 communicates with the integrated control unit. The device 100 transmits the image to the integrated control unit.

The integrated control unit communicates with the device 100. The integrated control unit receives at least one image from the device 100. The integrated control unit controls the lighting devices 200a to 200l on the basis of the received image.

FIG. 2 illustrates a wearable device according to an embodiment of the present invention.

Referring to FIG. 2, the device 100 may be a glasses type wearable device. The device 100 may be configured such that a user can put the device 100 on the head and may include a frame part (a case, a housing or the like) therefor. The frame part may be formed of a flexible material such that the user can easily wear the device 100. FIG. 2 illustrates the frame part including a first frame 101 and a second frame 102.

The frame part is supported by the user's head and has a space in which various components are received. As shown, electronic components such as a device controller 180 and an audio output module 152 are attached to the frame part. Further, a lens 103 that covers at least one of the left and right eyes of the user may be detachably attached to the frame part.

The device controller 180 is configured to control electronic components included in the device 100. In this figure, the device controller 180 is attached to a portion of the frame part, which corresponds to one side of the user's head. However, the position of the device controller 180 is not limited thereto.

The device 100 includes a display unit 151 that receives a control command from the device controller 180 and outputs the control command as a predetermined image.

The device 100 includes at least one camera 160. In FIG. 2, the device 100 includes a first camera 160a and a second camera 160b.

In this figure, the first camera 160a is included in the device controller 180 and the second camera 160b is provided to a portion of the frame part, which is close to one eye of the user. The positions of the first and second cameras 160a and 160b are not limited thereto.

The device 100 may include user input units 123A and 123B configured to receive control commands. Any device operating in a tactile manner may be employed as the user input units 123A and 123B such that the user can manipulate the user input units 123A and 123B in a tactile manner such as touch and push. In this figure, push type and touch type user input units 123A and 123B are respectively provided to the frame part and the device controller 180.

In addition, the device 100 may include a microphone (not shown) for receiving sound and processing the sound as electrical audio data and the audio output module 162 for outputting sound. The audio output module 152 may be configured to transmit sound in a normal audio output manner or bone conductive manner. When the audio output module 152 is implemented as a bone conductive module, the audio output module 152 comes into contact with the user's head when the user wears the device 100 and vibrates the user's skull to transfer sound.

Figure 3A:
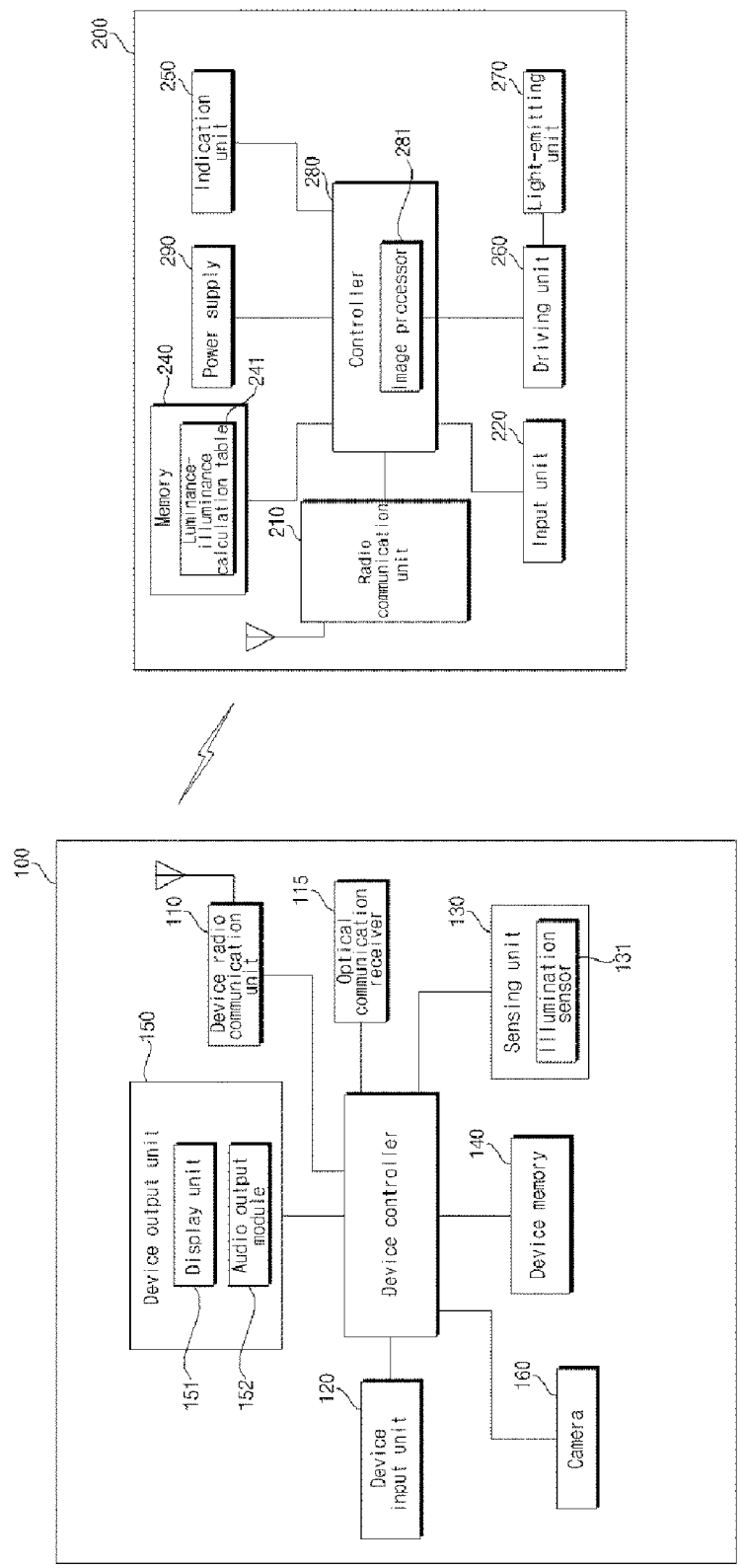
FIG. 3A is a block diagram of a lighting system according to a first embodiment of the present invention.

FIG. 3A is a block diagram of a lighting system according to a first embodiment of the present invention.

Referring to FIG. 3A, the lighting system according to the first embodiment of the present invention may include the device 100 and the lighting device 200. Here, the device 100 may be the glasses type wearable device illustrated in FIG. 2.

The device 100 may include a device radio communication unit 110, an optical communication receiver 115, a device input unit 120, a sensing unit 130, a device memory 140, a device output unit 150 and the device controller 180.

The device radio communication unit 110 may include one or more modules that enable radio communication between the device 100 and the lighting device 200 or between the device 100 and the integrated control unit 300. Further, the device radio communication unit 110 may include one or more modules that connect the device 100 to one or more communication networks.

The device radio communication unit 110 may communicate with the lighting device 200 using Bluetooth. Bluetooth enables low-power communication and requires low costs for installation. Accordingly, Bluetooth is desirable when short range communication is performed between the device 100 and the lighting device 200 indoors.

The device radio communication unit 110 may use communication schemes such as Wi-Fi Direct, RFID (Radio Frequency Identification), IrDA (Infrared Data Association), UWB (Ultra Wideband), ZigBee and NFC (Near Field Communication) in addition to Bluetooth.

The device radio communication unit 110 communicates with the lighting device 200 so as to transmit information sensed by the sensing unit 130 or an image captured by the camera 160 to the lighting device 200. Alternatively, the device radio communication unit 110 may transmit a radio control signal for controlling the lighting device 200 according to an embodiment.

The optical communication receiver 115 may convert a light signal into an electrical signal to receive information. The optical communication receiver 115 may receive a light signal generated from a light-emitting unit 270 included in the lighting device 200. For example, optical communication receiver 115 can acquire ID information of the lighting device 200 through a light signal generated from the light-emitting unit 270.

The optical communication receiver 115 may include a lens (not shown), a photodiode (not shown), an amplifier (not shown) and a demodulator (not shown). The lens (not shown) concentrates external light. For example, the lens (not shown) can concentrate light emitted from a light source of a traffic sign or light emitted from a light source included in a vehicle located in front of the device 100. The photodiode (not shown) can convert light concentrated by the lens (not shown) into an electric signal. For example, the photodiode (not shown) can use at least one of a p-n junction photodiode, a p-i-n photodiode and an avalanche photodiode. The amplifier (not shown) amplifies the converted electric signal. The amplifier (not shown) may include at least one amplification circuit for amplifying signals. The demodulator (not shown) demodulates the converted electric signal to extract necessary information according to various demodulation methods. The demodulated signal is transmitted to the controller 180. The demodulator (not shown) may include at least one demodulation circuit for demodulating signals.

The device input unit 120 may include a microphone (not shown) for audio signal or an audio input unit and user input units (not shown) for receiving information from the user (for example, touch key, mechanical key and the like). The device input unit 120 may include the camera 160 or a video input unit for video signal input. Audio data or image data collected by the device input unit 120 may be analyzed and processed as a control command of the user. For example, when the device enters a first mode, the device controller 180 can receive user's voice through the microphone to control the device to enter the first mode. Here, the first mode may be a mode for controlling lighting on the basis of at least one image acquired through the camera 160 while the device 100 and the lighting device 200 are connected through communication. The image may be an image of a space, which is acquired in a user's line of sight. Here, the space may be a space to which light is provided according to lighting.

A sensing unit 130 may include at least one sensor for sensing at least one of information on the device 100, information on the environment surrounding the device 100 and user information.

For example, the sensing unit 130 can include at least one of an illumination sensor 131, a motion sensor, an optical sensor (e.g., a camera), a touch sensor, a proximity sensor, an acceleration sensor, a magnetic sensor, a G-sensor, a gyroscope sensor, an RGB sensor, an infrared (IR) sensor, a fingerprint scanning sensor, an ultrasonic sensor, a microphone, a battery gauge, an environmental sensor (e.g., a barometer, hygrometer, thermometer, radioactive sensor, heat sensor, gas sensor and the like) and a chemical sensor (e.g., an electronic nose, healthcare sensor, biometric sensor and the like). The device disclosed in the specification may combine information sensed by at least two of the aforementioned sensors and use the combined information.

The illumination sensor 131 senses illuminance of light surrounding the device 100 in a predetermined space. The illumination sensor 131 includes an element having resistance varying with the intensity of surrounding light. The illumination sensor 131 measures illuminance by calculating voltage or current variation according to resistance change of the element.

The device memory 140 stores data supporting various functions of the device 100. The device memory 140 may store a plurality of application programs (or applications) executed in the device 100 and data and commands for operations of the device 100. In addition, the device memory 140 may store image data obtained through the camera 160.

The device output unit 150 generates visual, aural or tactile output and may include at least one of a display unit 151, an audio output unit 152, a haptic module (not shown) and an optical output unit (not shown).

The display unit 151 may be implemented in the form of a head mounted display (HMD). The HMD is a display that is put on the head of a user to directly display images in front of the eyes of the user. When the user wears the glasses type device 100, the display unit 151 may be arranged to correspond at least one of the left and right eyes of the user such that the display unit 151 can directly display images in front of the eyes of the user.

The display unit 151 may project an image onto the eyes of the user using a prism. The prism may be transparent such that the user can see the projected image and a normal front view (range seen through the eyes of the user) together.

That is, the image output through the display unit 151 and a normal view may overlap. The device 100 can provide augmented reality (AR) that shows a real image or background and a virtual image in an overlapping manner using the aforementioned display characteristics.

The audio output module 153 outputs audio data received through the device radio communication unit 110 in a call signal reception mode, a call mode, a recording mode, a voice recognition mode, a broadcast reception mode or the like, or stored in the memory 160. In addition, the audio output module 153 outputs audio signals related to functions executed in the device 100, for example, call signal reception sound, message reception sound and the like. The audio output module 153 may include a speaker, a buzzer and the like. When the device 100 enters the first mode or a second mode, the audio output module 153 can notify the user that the device 100 enters the first or second mode using sound.

The camera 160 may include the first camera 160a and the second camera 160b.

The first camera 160a may be arranged to photograph a space at which the user gazes. That is, the first camera 160a can be arranged to capture an image in front of the user.

The first camera 160a may acquire an image of an object located in front of the user. Here, the object may be a space in the user's line of sight. The space may be a space to which light is provided according to lighting.

The second camera 160b may be arranged in proximity to at least one of the left and right eyes of the user and configured to photograph an image of the user.

The camera 160 includes an image sensor. The image sensor may be a CCD or CMOS.

The camera 160 may acquire a plurality of images of a predetermined object for a predetermined time. Here, the predetermined time and the number of acquired images are set values. For example, the camera 160 can acquire 50 images of an object for 10 seconds in the first mode. The images of the object can be transmitted to an image processor 181, 281 and 381 and processed thereby.

When the same object is sensed for a predetermined time or longer, the camera 160 may acquire an image of the object. For example, the camera 160 can acquire an image of a space when the space is sensed for 3 seconds or longer.

The device 100 may further include an infrared light source (not shown) in order to acquire high-resolution images. Here, the camera 160 is provided with an infrared filter. The infrared filter projects infrared light onto an object. The camera 160 may output an image of the object, which reflects only a frequency component of the projected infrared light, through the infrared filter. When the camera 160 includes the infrared light source (not shown), the camera 160 can acquire a high-resolution image of the object, which reflects only the frequency component of infrared light.

The device controller 180 controls overall operation of the device 100. The device controller 180 processes signals, data, information and the like, which are input or output through the components of the device 100. The device controller 180 may provide appropriate information or functions to the user or process the information or functions by executing application programs stored in the device memory 140.

In addition, the device controller 180 may control at least part of the components of the device 100. Further, the device controller 180 may operate at least two components of the device 100 in a combined manner for execution of the application programs.

The device controller 180 may generate control signals on the basis of data transmitted from the image processor 181.

The device controller 180 may be implemented using at least one of application specific integrated circuits (ASICs), digital signal processors (DSPs), digital signal processing devices (DSPDs), programmable logic devices (PLDs), field programmable gate arrays (FPGSs), processors, controllers, micro-controllers, microprocessors and electrical units for executing other functions.

The lighting device 200 may include a radio communication unit 210, an input unit 220, a memory 240, an indication unit 250, a driving unit 260, a light-emitting unit 270, a controller 280 and a power supply 290.

The radio communication unit 210 transmits/receives data to/from the device 100 by communicating with the device 100. The radio communication unit 210 is connected to the controller 280 and transmits/receives data to/from the device 100 according to a control signal of the controller 280. The radio communication unit 210 transmits data received from the device 100 to the controller 280.

The radio communication unit 210 may communicate with at least one device 100 to receive an image from the device 100. Here, the image may be an image of a space, which is acquired in the user's line of sight. The space may be a space to which light is provided according to the lighting device 200.

The radio communication unit 210 may transmit data corresponding to a calculated average luminance value or illuminance value to the device 100. Upon reception of the data, the device 100 may output the average luminance value or illuminance value through the device output unit 150.

The radio communication unit 210 may receive a radio control signal from the device 100 according to an embodiment.

The radio communication unit 210 may communicate with the device 100 using Bluetooth.

The radio communication unit 210 may use communication schemes such as Wi-Fi Direct, RFID (Radio Frequency Identification), IrDA (Infrared Data Association), UWB (Ultra Wideband), ZigBee and NFC (Near Field Communication) in addition to Bluetooth.

The radio communication unit 210 may include an RF circuit. The radio communication unit 210 may transmit and receive an RF signal that is an electromagnetic signal. The RF circuit may convert an electrical signal into an electromagnetic signal and vice versa and communicate with the device 100 using the converted electromagnetic signal.

For example, the RF circuit can include an antenna system, an RF transceiver, one or more amplifiers, a tuner, one or more oscillators, a digital signal processor, a codec chipset, a memory and the like. The RF circuit may include a known circuit to execute a communication function.

The radio communication unit 210 may receive information sensed by the sensing unit 130 included in the device 100 by communicating with the device 100. For example, the radio communication unit 210 may receive, from the device 100, information on illumination of the surrounding environment, which is sensed by the illumination sensor 131.

The radio communication unit 210 may receive image data acquired through the camera 160 from the device 100. For example, the radio communication unit 210 can receive at least one image through the camera 160. Here, the image may be an image of a space located in the user's line of sight. The space may be a space to which light is provided according to the lighting device 200.

The input unit 220 may receive information on selected brightness of the light-emitting unit 270 from the user. The input unit 220 may be included in the lighting device 200. Alternatively, the input unit 220 may be separated from the lighting device 200. The input unit 220 may be connected to a remote controller (not shown) to receive user input. The input unit 220 may be configured in the form of at least one of a keypad, a dome switch, a touch pad (constant pressure or capacitive), a jog wheel and a jog switch.

For example, when the input unit 220 is configured in the form of the jog wheel, the user can control the brightness of the lighting device 200 by rotating the jog wheel. The input unit 220 may generate a brightness selection signal according to user selection and output the brightness selection signal to the controller 280. Here, the user can select turning on or off of the lighting device 200 and thus whether power is supplied to the lighting device can be determined.

For example, the input unit 220 generates an illuminance increase signal when the user selects increase of illuminance of the lighting device 200. The input unit 220 generates an illuminance decrease signal when the user selects reduction of illuminance of the lighting device 200. That is, the input unit 220 can directly receive user input.

The memory 240 may store data and commands for operations of the lighting device 200.

The memory 240 may store data received from the device 100. For example, the memory 240 may store at least one image received from the device 100. Further, the memory 240 may store control signals received from the device 100.

The memory 240 may store a predetermined personal identification number (PIN) of the device 100, which is used for communication security.

The memory 240 may include at least one non-volatile memory such as a magnetic disk storage, a flash memory device and other non-volatile solid-state memory devices. However, the memory 240 is not limited thereto and may include any readable storage medium.

For example, the memory 240 can include an electronically erasable and programmable read only memory (EEPROM). Information can be written/erased into/from the EEPROM according to the controller 280 during operation of the controller 280. The EEPROM is a memory device in which information stored therein is maintained without being erased even when power is not supplied thereto.

The memory 240 may include a luminance-illuminance calculation table 241. Here, the luminance-illuminance calculation table 241 is reference data which is determined such that an illuminance value corresponding to an extracted average luminance value can be extracted. The luminance-illuminance calculation table 241 may be determined through testing.

In addition, the memory 240 stores a reference value. The reference value may refer to an illuminance reference value which is compared with a calculated illuminance value and used to control the light-emitting unit 270. The reference value may be received from the device 100 through the radio communication unit 210. That is, the user can set the illuminance reference value through the device 100 and the set illuminance reference value can be transmitted to the lighting device 200 through communication.

The indication unit 250 indicates whether the lighting device 200 communicates with the device 100. The indication unit 250 can prevent confusion in control of the lighting device 200 and prevent user-set lighting from being disturbed by attempting to connect an additional device to the lighting device 200 by indicating whether the lighting device 200 is currently connected to the device 100 for communication.

Further, the indication unit 250 may indicate whether the lighting device 200 enters the first mode.

When the lighting device 200 enters the first mode while being connected to the device 100 for communication, the indication unit 250 can indicate entry to the first mode through a speaker, a lamp or the like.

The driving unit 260 receives a control signal from the controller 280. The driving unit 260 applies driving current to the light-emitting unit 270 according to the control signal. The light-emitting unit 270 is controlled according to the driving current applied by the driving unit 260. For example, the driving unit 260 controls illuminance, dimming, color temperature, color and flickering of light emitted from the light-emitting unit 270.

The light-emitting unit 270 includes a substrate and at least one light-emitting element mounted on the substrate. The light-emitting element emits light according to power applied thereto and the brightness of the light is varied according to the level of the applied power. Further, the light-emitting element can change color temperature of light emitted therefrom according to power applied thereto and vary the color of light in a combination of red (R), green (G) and blue (B). The light-emitting unit 270 may include a plurality of LED elements. Specifically, the light-emitting unit 270 includes a white LED, a red LED, a green LED and a blue LED according to reaction with a fluorescent substance. The light-emitting unit 270 is driven by being provided with driving current from the driving unit 260.

The controller 280 receives data from the radio communication unit 210. The controller 280 controls the light-emitting unit 270 on the basis of the received data. That is, the controller 280 can control the light-emitting unit 270 by transmitting a control signal to the driving unit 260 on the basis of lighting control data, thereby controlling lighting characteristics.

The controller 280 may control the light-emitting unit 270 using an illuminance value calculated on the basis of a received image. For example, the controller 280 can measure individual luminance values of pixels included in the image, calculate an average luminance value on the basis of the individual luminance values and control the light-emitting unit 270 on the basis of an illuminance value corresponding to the average luminance value. Here, the controller 280 may calculate the illuminance value from the average luminance value through the luminance-illuminance calculation table 241 stored in the memory 240.

When the image is a moving image, the controller 280 may measure individual luminance values of pixels included in the image, calculate an average luminance value on the basis of the individual luminance values and control the light-emitting unit 270 according to an illuminance value corresponding to the average luminance value, on the basis of at least one frame of the moving image.

The controller 280 compares the calculated illuminance value with the reference value stored in the memory 240. When the calculated illuminance value is greater than the reference value, the controller 280 can control the light-emitting unit 270 to reduce the brightness of light provided to the space or not to provide light to the space. When the calculated illuminance value is less than the reference value, the controller 280 can control the light-emitting unit 270 to increase the brightness of light provided to the space.

The controller 280 may include the image processor 281 which processes images on the basis of computer vision. The image processor 281 will be described in detail with reference to FIG. 3B.

The controller 280 may generate a control signal on the basis of data received from the image processor 281.

Further, the controller 280 may generate a control signal on the basis of data stored in the memory 240.

The controller 280 may control the light-emitting unit 270 on the basis of a radio control signal received through the radio communication unit 210 according to an embodiment. Here, the radio control signal may be based on an illuminance value calculated on the basis of an image of the space, which is generated by the device 100. The illuminance value may correspond to an average luminance value calculated on the basis of individual luminance values of pixels of the image.

The controller 280 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electrical units for executing other functions.

The power supply 290 is connected to a power supply source and supplies power to the lighting device 200. The power supply 290 may include a converter which performs DC-AC conversion according to used power form. For power efficiency, the power supply 290 may additionally include a power-saving circuit or a voltage dropout regulator that provides constant current of a predetermined level.

When a plurality of devices 100 is located in proximity to the lighting device 200, communication connection between the lighting device 200 and the devices 100 may become a problem. Further, when connecting another device to the lighting device 200 is attempted while the lighting device 200 and the device 100 are connected for communication, a problem may be generated.

In this case, the controller 280 may control the radio communication unit 210 to generate a communication channel with a first device 100a having high priority on the basis of a connection request order. That is, the radio communication unit 210 generates a communication channel with the first device 100a which attempts connection with the lighting device 200 first, from among the plurality of devices 100 which has transmitted/received a connection signal to/from the lighting device 200. This is a method of forming a communication channel without additional pin code input and thus has advantages of short communication channel generation time and easy use of the method owing to a simple communication channel generation process of the lighting device.

When the communication channel with the first device 100a is generated, the controller 280 may control the radio communication unit 210 not to respond to a connection signal of another device 100b. Accordingly, it is possible to prevent confusion in control of the light-emitting unit 270 due to connection of a plurality of devices 100a and 100b and change of user settings by other persons.

The present invention may simultaneously generate a plurality of communication channels in response to a connection signal of the other device 100b even after generation of the communication channel with the first device 100a.

When connection signals are transmitted to the radio communication unit 210 from a plurality of devices 100, the controller 280 may control the radio communication unit 210 to receive personal identification number (PIN) codes from the plurality of devices 100, compare the PIN codes with the PIN code stored in the memory 240 and generate a communication channel with the first device 100a having highest priority from among devices having PIN codes corresponding to the PIN code stored in the memory 240. In this case, the memory 240 can store the PIN code of the radio communication unit 210 and device connection priority.

Specifically, the controller 280 controls the radio communication unit 210 to transmit a PIN code request signal to the plurality of devices 100 that has transmitted the connection signals. Then, the controller 280 compares PIN codes transmitted from the plurality of devices 100 with the PIN code stored in the memory 240 and determines priority of devices 100 having PIN codes corresponding to the PIN code stored in the memory 240.

Accordingly, the lighting device 200 generates a communication channel with the first device 100a having highest priority. The radio communication unit 210 does not respond to a device having a PIN code that does not correspond to the PIN code stored in the memory 240.

Since the aforementioned communication channel generation method requires a PIN code for generation of a communication channel, the light-emitting unit can be prevented from being controlled according to unpermitted connection of other wearable devices.

Figure 3B:
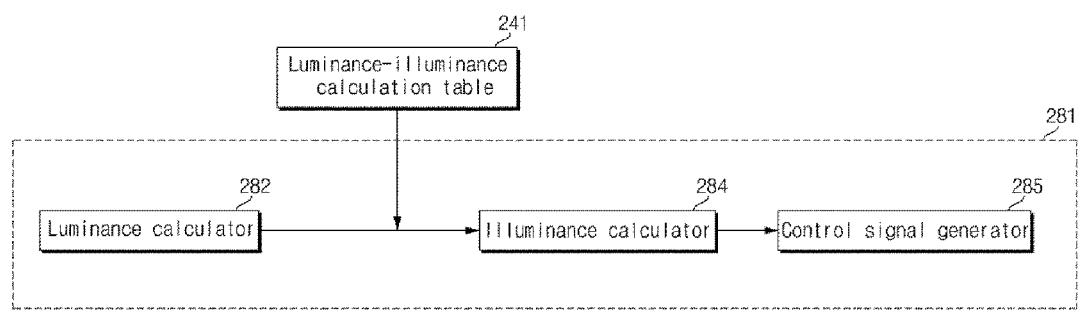
FIG. 3B is a block diagram of an image processor shown in FIG. 3A.

FIG. 3B is a block diagram of the image processor shown in FIG. 3A.

The image processor 281 may include a luminance calculator 282, an illuminance calculator 284 and a control signal generator 285.

The luminance calculator 282 measures individual luminance values of pixels included in an image of a space through image analysis. The luminance calculator 282 calculates an average luminance value on the basis of the individual luminance values of the pixels, measured from the image. The luminance calculator 282 may calculate the average luminance value by measuring individual luminance values of all pixels included in the image, summing the individual luminance values and dividing the sum by the total number of pixels. Alternatively, the luminance calculator 282 may calculate the average luminance value by selecting arbitrary pixels from among all pixels included in the image, measuring individual luminance values of the selected pixels, summing the individual luminance values and dividing the sum by the number of selected pixels. Alternatively, the luminance calculator 282 may calculate the average luminance value by dividing the image into a plurality of mosaic regions each having a predetermined size using a pixelate-mosaic filter, measuring luminance values of the mosaic regions and averaging the luminance values.

When the image is a moving image, the luminance calculator 282 may measure individual luminance values of respective pixels included in the image, on the basis of at least one frame of the moving image. The luminance calculator 282 may calculate the average luminance value on the basis of the individual luminance values.

The illuminance calculator 284 calculates an illuminance value corresponding to the average luminance value on the basis of the average luminance value calculated by the luminance calculator 282. The illuminance calculator 284 may calculate the illuminance value corresponding to the average luminance value by comparing the luminance-illuminance calculation table 241 included in the memory 240 with the average luminance value. Here, the luminance-illuminance calculation table 241 is reference data which is determined such that an illuminance value corresponding to an extracted average luminance value can be extracted. The luminance-illuminance calculation table 241 may be determined through tests.

The control signal generator 285 generates a control signal for controlling the light-emitting unit 270 on the basis of the illuminance value calculated by the illuminance calculator 284. The control signal is input to the driving unit 260 and the driving unit 260 controls the light-emitting unit 270 through driving current.

When the calculated illuminance value is greater than the reference value stored in the memory 240, the control signal generator 285 can generate a control signal for reducing the brightness of light provided to the space and output the control signal. In this case, the control signal generator 285 may generate a control signal for providing no light to the space and output the control signal.

When the calculated illuminance value is less than the reference value stored in the memory 240, the control signal generator 285 can generate a control signal for increasing the brightness of light provided to the space and output the control signal.

Figure 4:
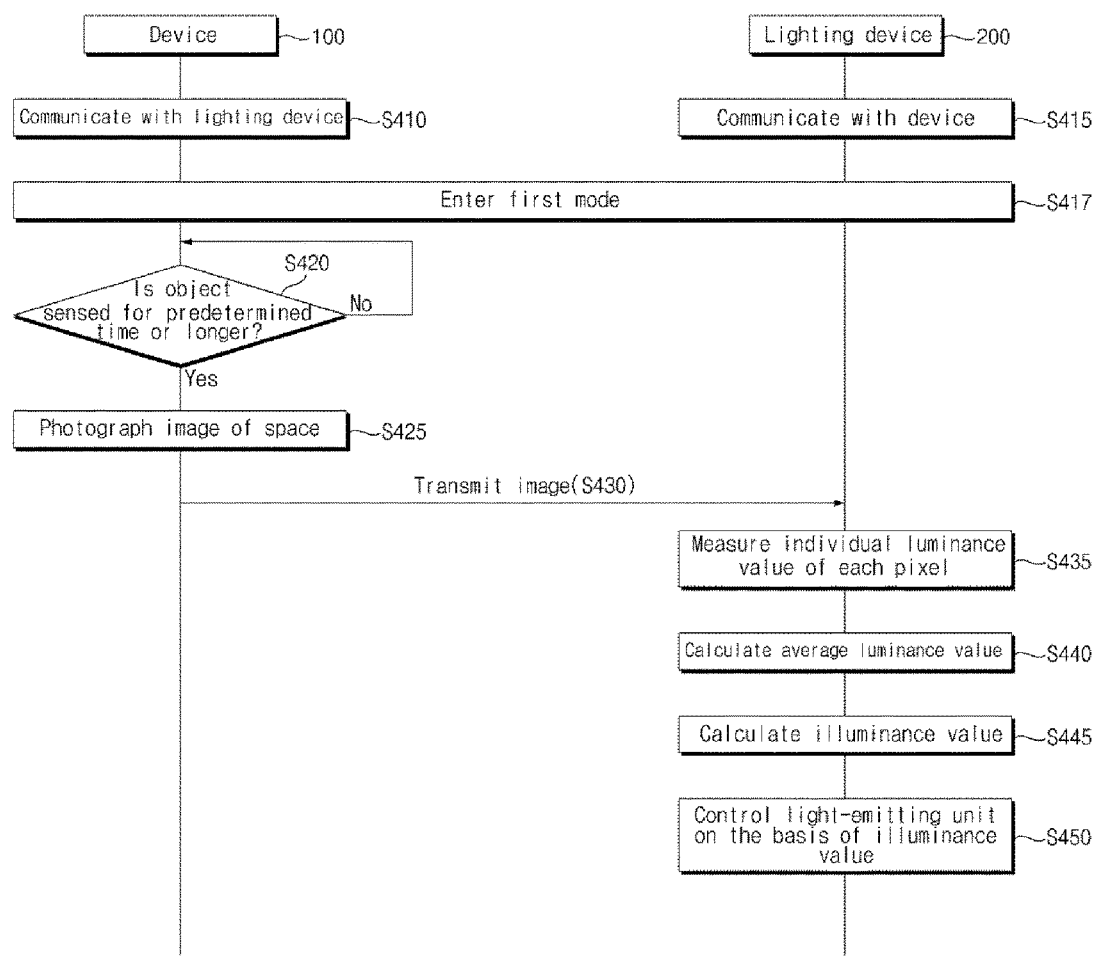
FIG. 4 is a signal flow of the lighting system according to the first embodiment of the present invention.

FIG. 4 illustrates a signal flow of the lighting system according to the first embodiment of the present invention.

FIG. 4 illustrates a case in which the lighting device 200 includes the image processor 281. Referring to FIG. 4, the device 100 generates a communication channel with the lighting device 200. That is, the device 100 is connected to the lighting device 200 for communication (S410 and S415).

The device 100 enters the first mode while the device 100 and the lighting device 200 are connected for communication (S417). Otherwise, the lighting device 200 enters the first mode. Here, the first mode may be a mode for controlling lighting on the basis of an image of a space while the device 100 and the lighting device are linked for communication. The first mode may be a mode for controlling the light-emitting unit 270 on the basis of an illuminance value calculated on the basis of the image. Here, the device controller 180 may receive user input for entering the first mode through the device input unit 120. Otherwise, the controller 280 may receive user input for entering the first mode through the input unit 220.

In the first mode, the device 100 determines whether an object is sensed for a predetermined time or longer, through the camera 160 (S420). That is, when the user gazes at a predetermined space for a predetermined time, the device 100 can sense the object for the predetermined time or longer through the camera 160.

When the object is sensed for the predetermined time or longer, the device 100 acquires an image of the space using the camera 160 (S425). Here, the image may be a still image or a moving image.

Upon acquisition of the image of the space, the device 100 transmits the image to the lighting device 200 through the device radio communication unit 110 (S430). The lighting device 200 receives the image from the device 100 through the radio communication unit 210.

Upon reception of the image, the lighting device 200 measures individual luminance values of pixels included in the image of the space through image analysis (S435). Then, the lighting device 200 calculates an average luminance value on the basis of the measured individual pixel values of the pixels included in the image (S440). Subsequently, the lighting device 200 calculates an illuminance value corresponding to the average luminance value on the basis of the calculated average luminance value (S445). The lighting device 200 controls the light-emitting unit 270 on the basis of the calculated illuminance value (S450).

Figure 5A:
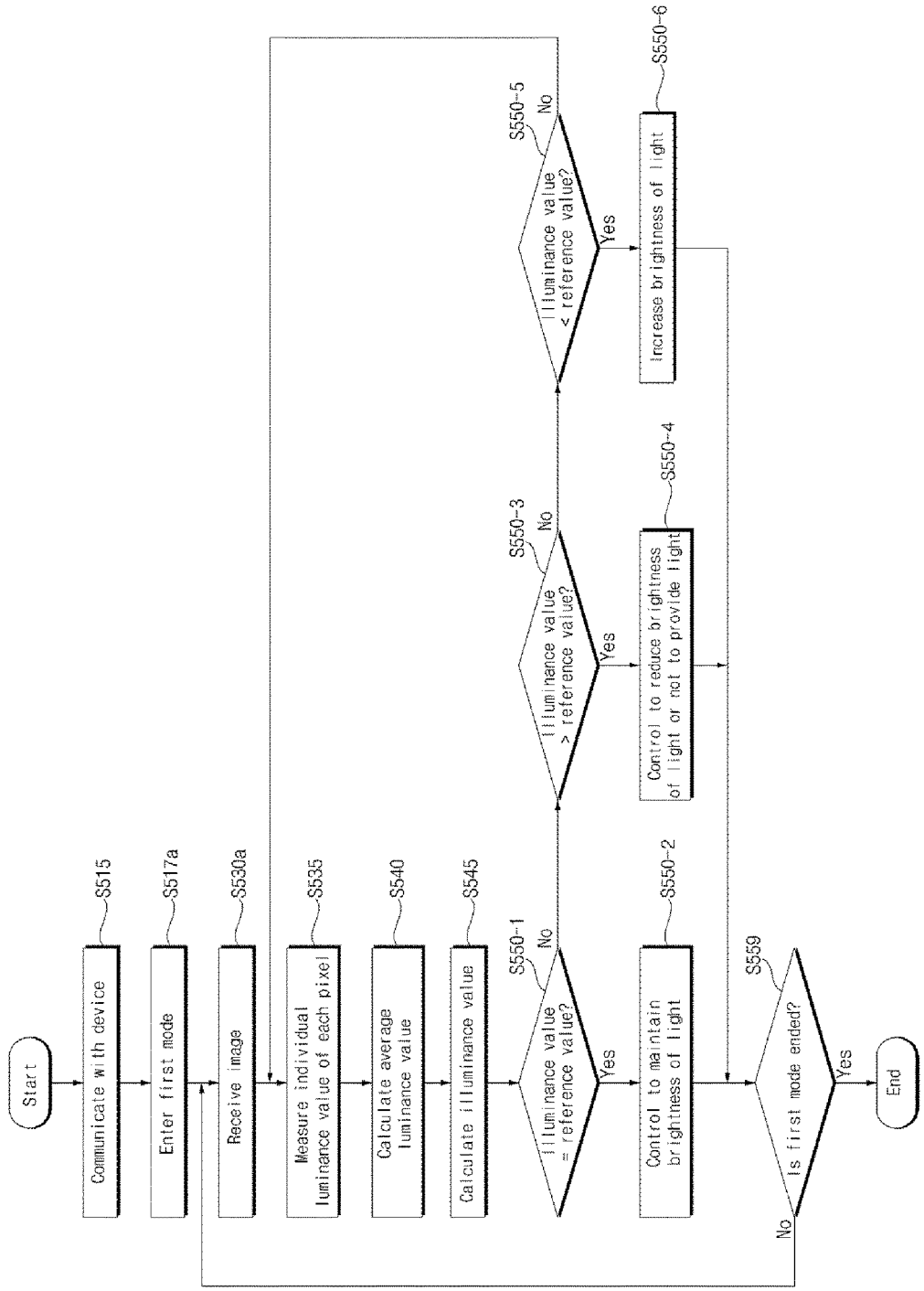
FIG. 5A is a flowchart of a lighting device according to the first embodiment of the present invention.

FIG. 5A is a flowchart of the lighting device according to the first embodiment of the present invention.

Referring to FIG. 5A, the controller 280 communicates with the device 100 (S515). Here, the device 100 may be the aforementioned glasses type wearable device which has been described with reference to FIG. 2.

The controller 280 enters the first mode while the device 100 and the lighting device 200 are linked for communication (S517a). The first mode may be a mode for controlling the light-emitting unit 270 according to an illuminance value calculated on the basis of an image. The lighting device 200 may enter the first mode through the device input unit 120 included in the device 100. The controller 280 receives a control signal corresponding to the operation of entering the first mode through the radio communication unit 210.

In the first mode, the controller 280 receives the image from the device 100 through the radio communication unit 210 (S530a). Here, the image may be an image of a space located in the user's line of sight. The space may be a space to which light is provided according to the lighting device 200. The image may be a still image or a moving image.

Upon reception of the image, controller 280 measures individual luminance values of pixels included in the image of the space (S535). Specifically, the operation of measuring the individual luminance values may be performed by the luminance calculator 282 included in the image processor 281.

Upon measurement of the individual luminance values, the controller 280 calculates an average luminance value on the basis of the individual luminance values of the pixels, measured from the image (S540). Specifically, the operation of calculating the average luminance value may be performed by the luminance calculator 282 included in the image processor 281.

Upon calculation of the average luminance value, the controller 280 calculates an illuminance value corresponding to the average luminance value on the basis of the average luminance value (S545). Specifically, the operation of calculating the illuminance value may be performed by the illuminance calculator 284 included in the image processor 281.

Upon calculation of the illuminance value, the controller 280 compares the illuminance value with the reference value (S550-1, S550-3 and S550-5). The controller 280 controls the light-emitting unit 270 on the basis of the result of comparison between the illuminance value and the reference value (S550-2, S550-4 and S550-6). Specifically, a control signal based on the illuminance value is generated by the control signal generator 285 included in the image processor 281 and output.

When the illuminance value is equal to the reference value (S550-1), the controller 280 controls the light-emitting unit 270 to maintain the brightness of light provided to the space (S550-2).

When the illuminance value is greater than the reference value (S550-3), the controller 280 controls the light-emitting unit 270 to reduce the brightness of light provided to the space or not to provide light to the space (S550-4).

When the illuminance value is less than the reference value (S550-5), the controller 280 controls the light-emitting unit 270 to increase the brightness of light provided to the space (S550-6).

The controller 280 determines whether the first mode is ended (S559) and terminates the operation when the first mode is ended. When the first mode is not ended, the controller 280 returns to step S530a to perform the corresponding operation. The first mode may be ended through the device input unit 120 included in the device 100. The controller 280 receives a control signal corresponding to the first mode ending operation through the radio communication unit 210.

Figure 5B:
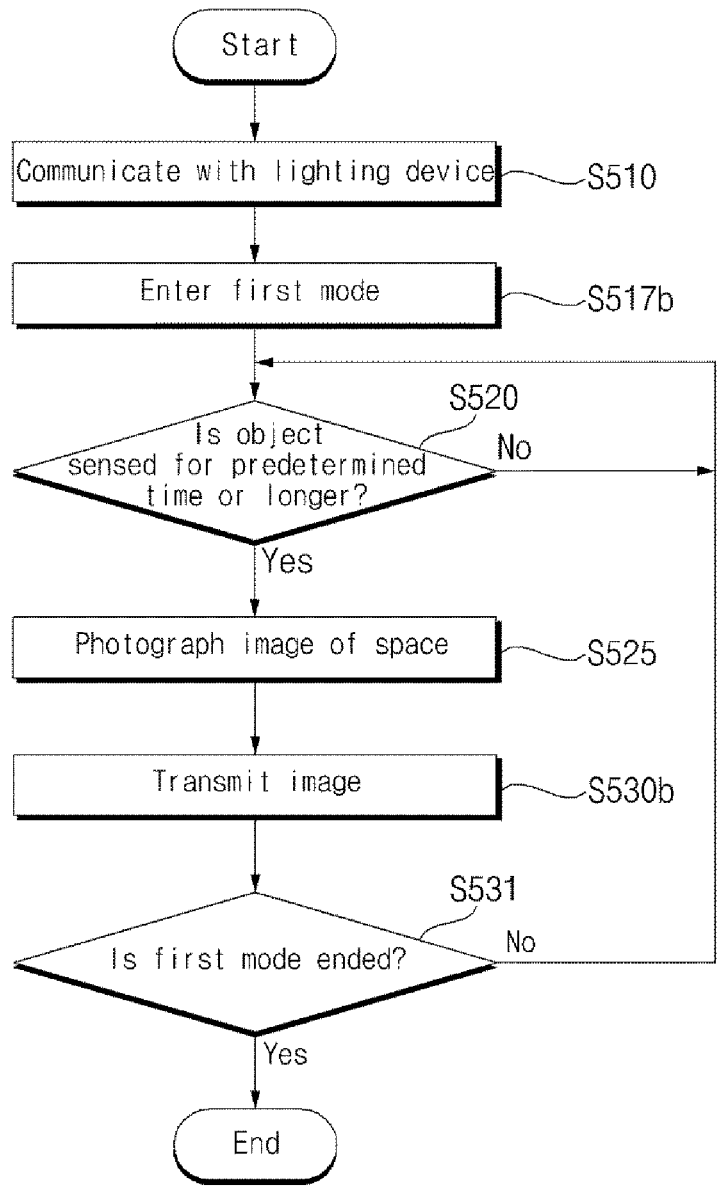
FIG. 5B is a flowchart of a device according to the first embodiment of the present invention.

FIG. 5B is a flowchart of the device according to the first embodiment of the present invention.

Referring to FIG. 5B, the device controller 180 communicates with the lighting device 200 (S510).

The device controller 180 enters the first mode while the device is linked to the lighting device 200 for communication (S517b). The first mode may be a mode for controlling the light-emitting unit 270 according to an illuminance value calculated on the basis of an image.

In the first mode, the device controller 180 determines whether an object is sensed for a predetermined time or longer, through the camera 160 (S520). That is, when the user gazes at a predetermined space for a predetermined time, the device controller 180 can sense the object for the predetermined time or longer through the camera 160.

When the object is sensed for a predetermined time or longer, the device controller 180 photographs an image of the space through the camera 160 (S525). Here, the image may be a still image or a moving image.

The device controller 180 transmits the image to the lighting device 200 through the device radio communication unit 110 (S530b).

Subsequently, the device controller 180 determines whether the first mode is ended (S531). When the first mode is ended, the device controller 180 terminates the operation. When the first mode is not ended, the device controller 180 returns to step S520 and performs the corresponding operation. The first mode is ended through the device input unit 120 included in the device 100.

Figure 6A:
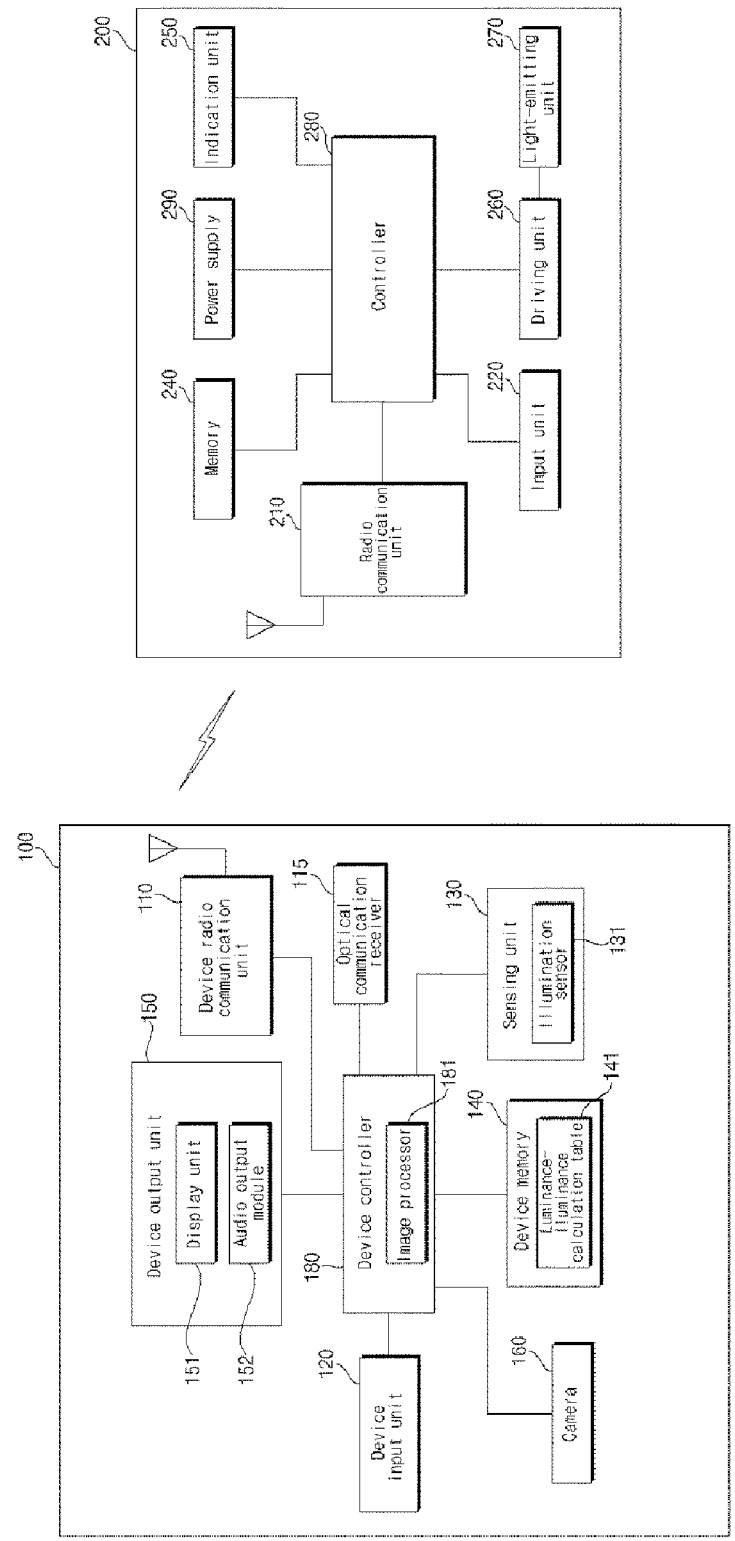
FIG. 6A is a block diagram of a lighting system according to a second embodiment of the present invention.

FIG. 6A is a block diagram of a lighting system according to a second embodiment of the present invention.

The lighting system according to the second embodiment is distinguished from the lighting system according to the first embodiment in that the image processor and the luminance-illuminance calculation table are included in the device 100.

A description will be given on the lighting device according to the second embodiments on the basis of the difference between the first and second embodiments.

The device memory 140 may include a luminance-illuminance calculation table 141. Here, the luminance-illuminance calculation table 141 is reference data which is determined such that an illuminance value corresponding to an extracted average luminance value can be extracted. The luminance-illuminance calculation table 141 can be determined through tests.

The device memory 140 stores a reference value. The reference value may refer to an illuminance reference value which is compared with a calculated illuminance value and used to generate a radio control signal. The reference value may be received through the device input unit 120.

The device controller 180 receives an image acquired through the camera 160. The image may be a still image or a moving image.

The device controller 180 may transmit a radio control signal to the lighting device 200 through the device radio communication unit 110 according to an illuminance value calculated on the basis of the received image. The radio control signal may be based on an illuminance value calculated on the basis of an acquired image of a space. Here, the device controller 180 can calculate the illuminance value from the average luminance value through the luminance-illuminance calculation table 141 stored in the device memory 140.

For example, the device controller 180 can measure individual luminance values of pixels included in the image. The device controller 180 may calculate the average luminance value on the basis of the individual luminance values. The device controller 180 may generate the radio control signal on the basis of the illuminance value corresponding to the average luminance value. The device controller 180 may transmit the radio control signal to the lighting device 200 through the device radio communication unit 110.

When the image is a moving image, the device controller 180 may measure individual luminance values of pixels included in the image on the basis of at least one frame of the moving image. The device controller 180 may calculate an average luminance value on the basis of the individual luminance values. The device controller 180 may generate a radio control signal on the basis of an illuminance value corresponding to the average luminance value. The device controller 180 may transmit the radio control signal to the lighting device 200 through the device radio communication unit 110.

The device controller 180 compares the calculated illuminance value with the reference value stored in the device memory 140. When the illuminance value is greater than the reference value, the device controller 180 may generate a radio control signal for reducing the brightness of light provided to the space or providing no light to the space. When the illuminance value is less than the reference value, the device controller 180 may generate a radio control signal for increasing the brightness of light provided to the space. The device controller 180 may transmit the generated radio control signal to the lighting device 100 through the device radio communication unit 110.

The device controller 180 may include the image processor 181 for processing images on the basis of computer vision. The image processor 181 will be described in detail with reference to FIG. 6B.

The device controller 180 may generate a control signal on the basis of data stored in the device memory 140.

Figure 6B:
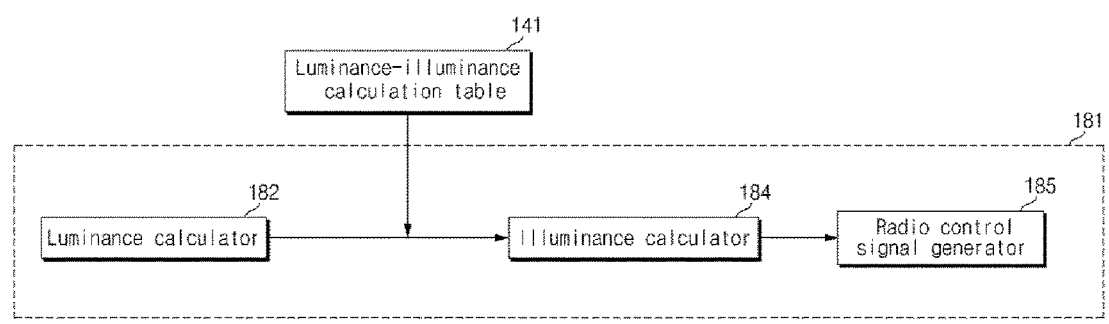
FIG. 6B is a block diagram of an image processor shown in FIG. 6A.

FIG. 6B is a block diagram of the image processor shown in FIG. 6A.

A luminance calculator 182 measures individual luminance values of pixels included in an image of a space through image analysis. The luminance calculator 182 calculates an average luminance value on the basis of the individual luminance values of the pixels, measured from the image.

An illuminance calculator 184 calculates an illuminance value corresponding to the average luminance value on the basis of the average luminance value calculated by the luminance calculator 182. The illuminance calculator 284 may calculate the illuminance value corresponding to the average luminance value by comparing the luminance-illuminance calculation table 241 included in the memory 140 with the average luminance value.

A radio control signal generator 185 generates a radio control signal on the basis of the illuminance value calculated by the illuminance calculator 184. The generated radio control signal is transmitted to the lighting device 200 through the device radio communication unit 110.

Figure 7:
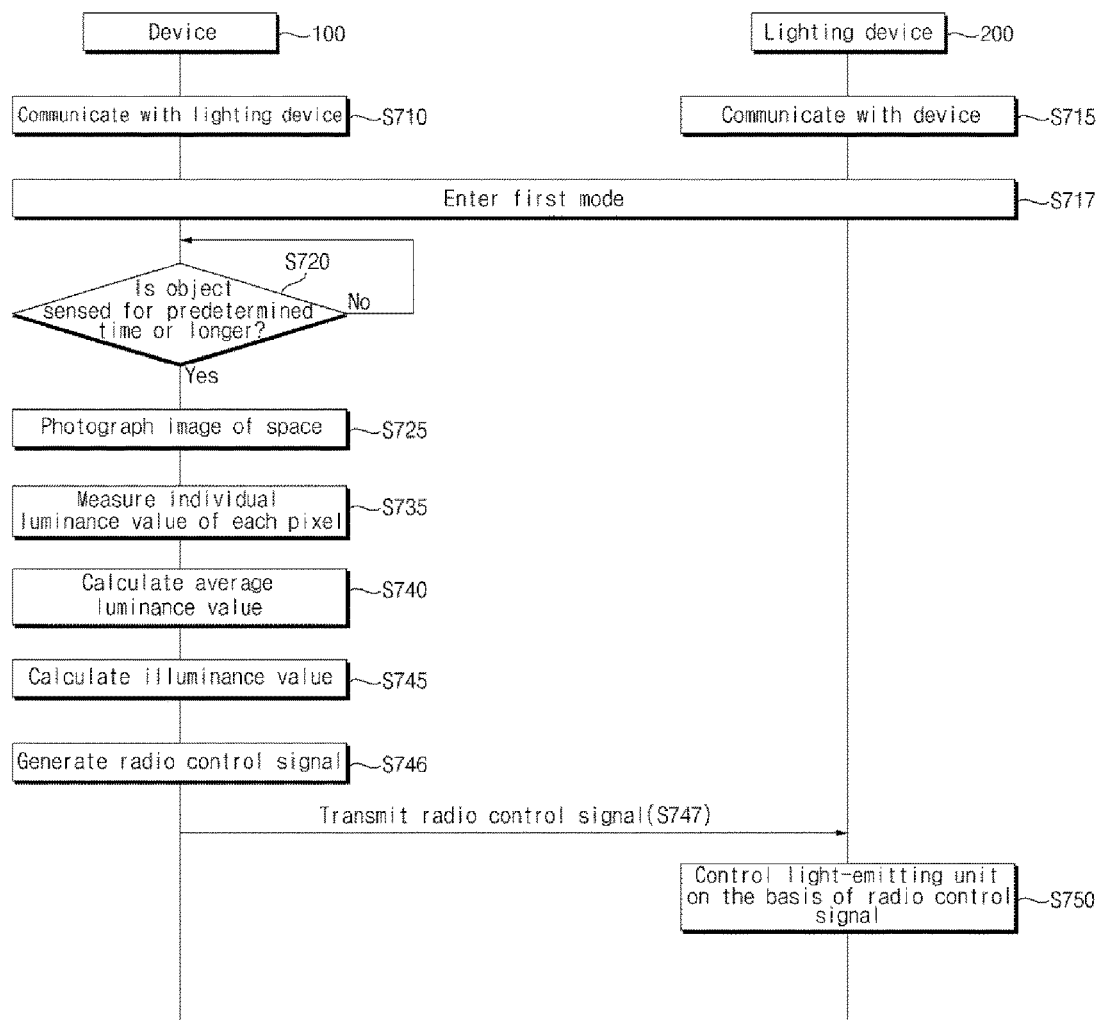
FIG. 7 is a signal flow of the lighting system according to the second embodiment of the present invention.

FIG. 7 is a signal flow of the lighting system according to the second embodiment of the present invention.

FIG. 7 illustrates a case in which the device 100 includes the image processor 181. A description will be given of the signal flow of the lighting system according to the second embodiment of the present invention on the basis of the difference between the first and second embodiments.

Referring to FIG. 7, the device 100 generates a communication channel with the lighting device 200. That is, the device 100 is connected to the lighting device 200 for communication (S710 and S715).

The device 100 enters the first mode while the device 100 and the lighting device 200 are connected for communication (S717).

In the first mode, the device 100 determines whether an object is sensed for a predetermined time or longer, through the camera 160 (S720).

When the object is sensed for the predetermined time or longer, the device 100 captures an image of the space using the camera 160 to acquire the image (S725).

Upon acquisition of the image, the device 100 measures individual luminance values of pixels included in the image of the space through image analysis (S735). Then, the device 100 calculates an average luminance value on the basis of the measured individual pixel values of the pixels included in the image (S440). Subsequently, the device 100 calculates an illuminance value corresponding to the average luminance value on the basis of the calculated average luminance value (S745).

The device 100 generates a radio control signal on the basis of the illuminance value (S746). The device 100 transmits the generated radio control signal to the lighting device 200 through the device radio communication unit 110 (S747).

The lighting device 100 controls the light-emitting unit 280 on the basis of the radio control signal (S750).

Figure 8A:
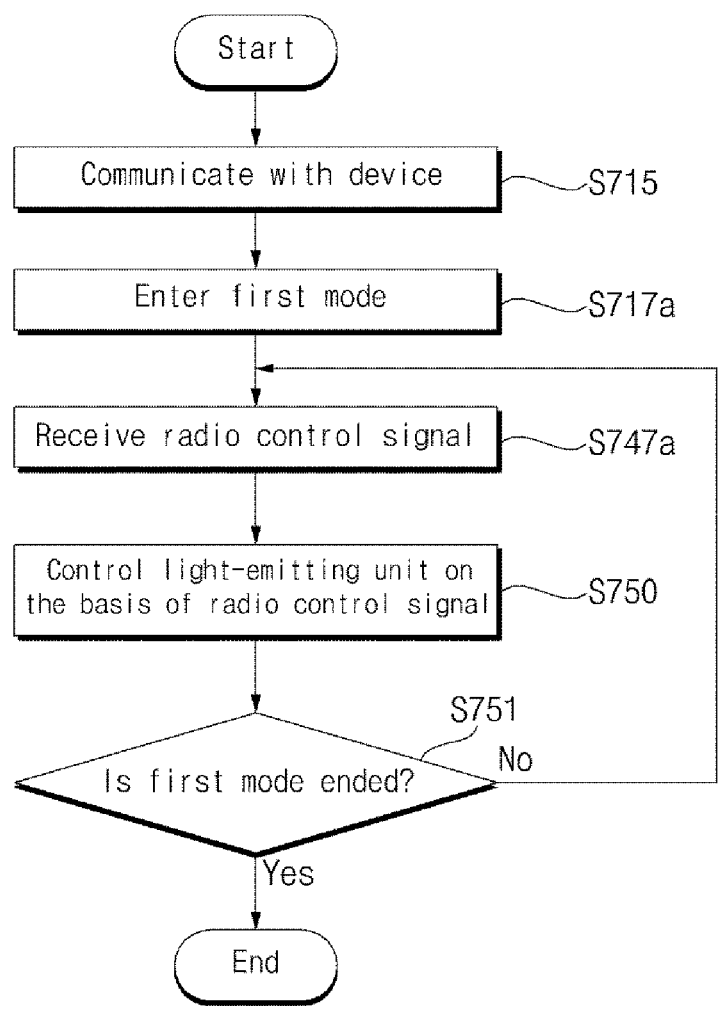
FIG. 8A is a flowchart of a lighting device according to the second embodiment of the present invention.

FIG. 8A is a flowchart of the lighting device according to the second embodiment of the present invention.

Referring to FIG. 8A, the controller 280 communicates with the device 100 (S715).

In the first mode, the controller 280 receives the radio control signal from the device 100 through the radio communication unit 210 (S750). Here, the radio control signal may be based on the illuminance value calculated on the basis of the acquired image of the space.

Upon reception of the radio control signal, the controller 280 may control the light-emitting unit 270 on the basis of the radio control signal (S750).

The controller 280 determines whether the first mode is ended (S751) and terminates the operation when the first mode is ended. When the first mode is not ended, the controller 280 returns to step S747*a* to perform the corresponding operation.

Figure 8B:
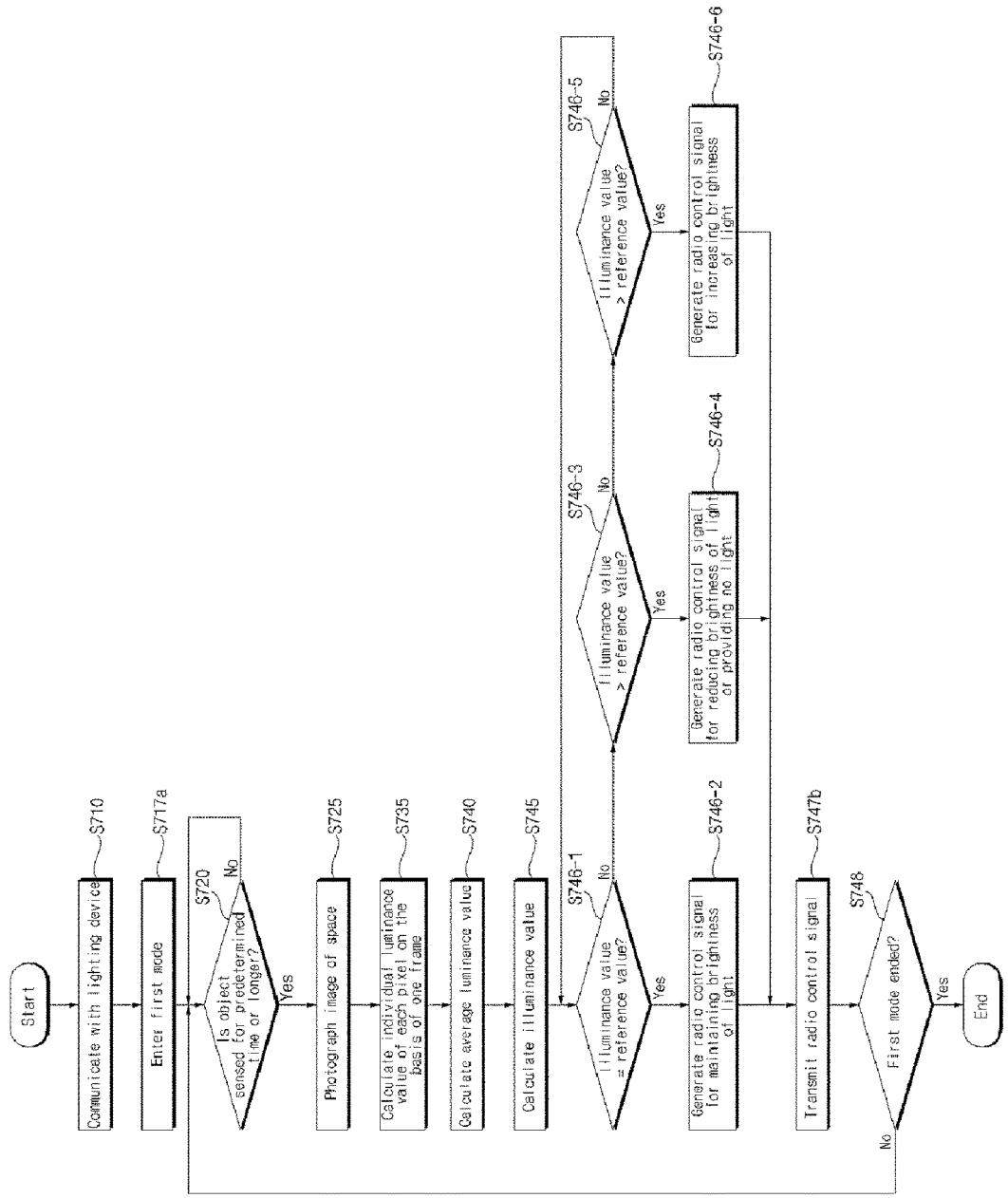
FIG. 8B is a flowchart of a device according to the second embodiment of the present invention.

FIG. 8B is a flowchart of the device according to the second embodiment of the present invention.

Referring to FIG. 8B, the device controller 180 communicates with the lighting device 200 (S710).

The device controller 180 enters the first mode while being linked to the lighting device 200 for communication (S717*b*).

In the first mode, the device controller 180 determines whether an object is sensed for a predetermined time or longer, through the camera 160 (S720).

When the object is sensed for a predetermined time or longer, the device 100 captures an image of the object through the camera 160 to acquire the image (S725).

Upon acquisition of the image, the device controller 180 measures individual luminance values of pixels included in the image of the space (S735). Specifically, the operation of measuring the individual luminance values may be performed by the luminance calculator 182 included in the image processor 181.

Upon measurement of the individual luminance values, the device controller 180 calculates an average luminance value on the basis of the individual luminance values of the pixels, measured from the image (S740). Specifically, the operation of calculating the average luminance value may be performed by the luminance calculator 182 included in the image processor 181.

Upon calculation of the average luminance value, the device controller 180 calculates an illuminance value corresponding to the average luminance value on the basis of the calculated average luminance value (S745). Specifically, the operation of calculating the illuminance value may be performed by the illuminance calculator 184 included in the image processor 181.

Upon calculation of the illuminance value, the device controller 180 compares the illuminance value with the reference value (S746-1, S746-3 and S746-5). The device controller 180 generates a radio control signal on the basis of the result of comparison between the illuminance value and the reference value (S746-2, S746-4 and S746-6). Specifically, the radio control signal based on the illuminance value is generated by the radio control signal generator 185 included in the image processor 181 and output.

When the illuminance value is equal to the reference value (S7460-1), the device controller 180 generates a radio control signal for maintaining the brightness of light provided to the space (S746-2).

When the illuminance value is greater than the reference value (S746-3), the device controller 180 generates a radio control signal for reducing the brightness of light provided to the space or for providing no light to the space (S746-4).

When the illuminance value is less than the reference value (S746-5), the device controller 180 generates a radio control signal for increasing the brightness of light provided to the space (S746-6).

Subsequently, the device controller 180 transmits the radio control signal to the lighting device 200 through the device radio communication unit 110 (S747b).

The device controller 180 determines whether the first mode is ended (S748) and terminates the operation when the first mode is ended. When the first mode is not ended, the device controller 180 returns to step S720 to perform the corresponding operation.

Figure 9A:
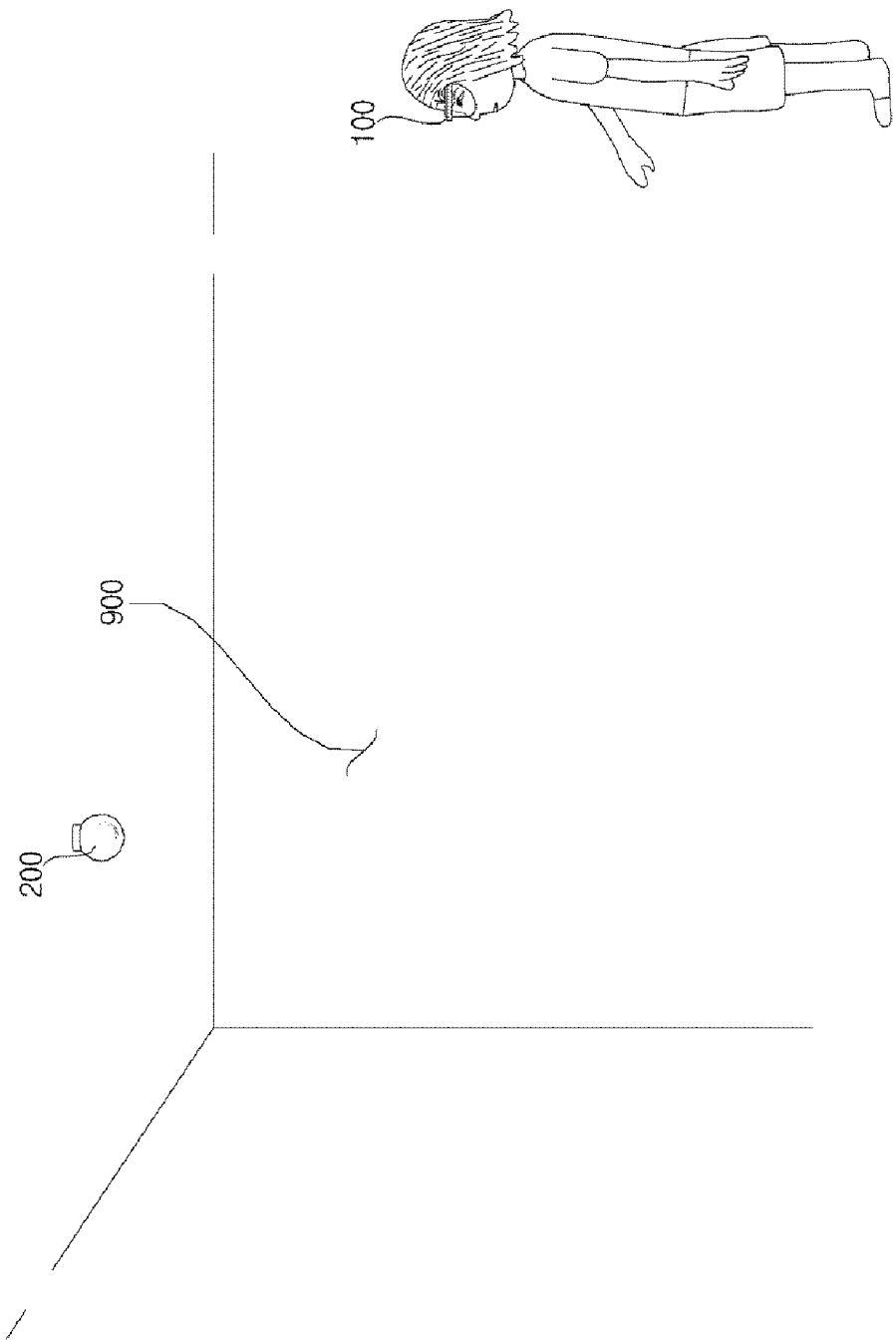
FIGS. 9A and 9B are views for explaining operations of the lighting systems according to the first and second embodiments of the present invention.
Figure 9B:
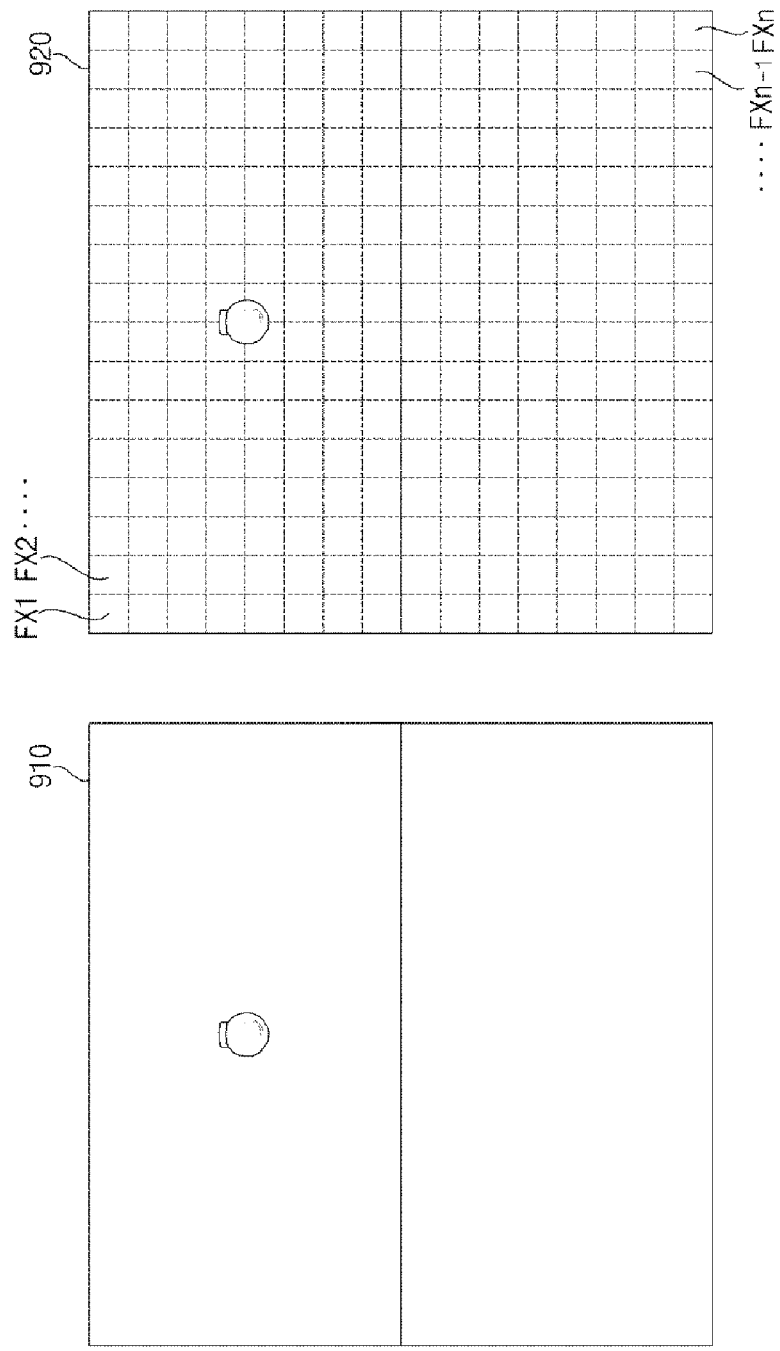

FIGS. 9A and 9B are views for explaining operations of the lighting systems according to the first and second embodiments of the present invention.

Description will be given of operation of the lighting system according to the first embodiment with reference to FIGS. 9A and 9B. The lighting device 200 communicates with the device 100. The lighting device 200 enters the first mode while being connected to the device 100 for communication. In the first mode, the lighting device 200 receives an image from the device 100 through the radio communication unit 210. Here, the image may be an image acquired through the camera 160 included in the device 100. Further, the image may be an image of a space in the user's line of sight. The image may be a still image or a moving image.

In FIG. 9B, reference numerals 910 and 920 indicate an image acquired through the camera 160 included in the device 100.

Upon reception of the image, the lighting device 200 measures individual luminance values of pixels PX1, PX2, . . . , FXn included in the image 920 of the space through image analysis. The lighting device 200 calculates an average luminance value on the basis of the individual luminance values. The lighting device 200 may calculate the average luminance value by measuring individual luminance values of all pixels PX1, PX2, . . . , FXn included in the image, summing the individual luminance values and dividing the sum by the total number of pixels. Alternatively, the lighting device 200 may calculate the average luminance value by selecting arbitrary pixels (e.g. PX10, FX20, . . . FX10n) from among all pixels included in the image, measuring individual luminance values of the selected pixels, summing the individual luminance values and dividing the sum by the number of selected pixels.

The lighting device 200 calculates an illuminance value corresponding to the average luminance value on the basis of the calculated average luminance value. The lighting device 200 may calculate the illuminance value corresponding to the average luminance value by comparing the luminance-illuminance calculation table 241 included in the memory 240 with the average luminance value. Here, the luminance-illuminance calculation table 241 is reference data which is determined such that an illuminance value corresponding to an extracted average luminance value can be extracted. The luminance-illuminance calculation table 241 may be determined through tests.

The lighting device 200 generates a control signal for controlling the light-emitting unit 270 on the basis of the illuminance value.

For example, the lighting device 200 can compare the illuminance value with the reference value and control the light-emitting unit 270 on the basis of the comparison result.

When the illuminance value is equal to the reference value, the lighting device 200 may control the light-emitting unit 270 to maintain the brightness of light provided to the space.

When the illuminance value is greater than the reference value, the lighting device 200 may control the light-emitting unit 270 to reduce the brightness of light provided to the space or not to provide light to the space.

When the illuminance value is less than the reference value, the lighting device 200 may control the light-emitting unit 270 to increase the brightness of light provided to the space.

A description will be given of operation of the lighting system according to the second embodiment with reference to FIGS. 9A and 9B. The lighting device 200 communicates with the device 100. The lighting device 200 enters the first mode while being connected to the device 100 for communication. In the first mode, the device 100 photographs an image of a space 900 through the camera 160 to acquire the image 910.

Upon acquisition of the image 910, the device 100 measures individual luminance values of pixels PX1, PX2, . . . , FXn included in the image 910 of the space 900 through image analysis. The device 100 calculates an average luminance value on the basis of the individual luminance values.

The device 100 calculates an illuminance value corresponding to the average luminance value on the basis of the calculated average luminance value.

Upon calculation of the illuminance value, the device 100 compares the illuminance value with the reference value. The device 100 generates a radio control signal on the basis of the result of comparison between the illuminance value and the reference value.

When the illuminance value is equal to the reference value, the device 100 generates a radio control signal for maintaining the brightness of light provided to the space.

When the illuminance value is greater than the reference value, the device 100 generates a radio control signal for reducing the brightness of light provided to the space or for providing no light to the space.

When the illuminance value is less than the reference value, the device 100 generates a radio control signal for increasing the brightness of light provided to the space.

The device 100 transmits the radio control signal to the lighting device 200 through the device radio communication unit 110.

Upon reception of the radio control signal, the lighting device 200 can control the light-emitting unit 270 on the basis of the radio control signal.

Figure 10:
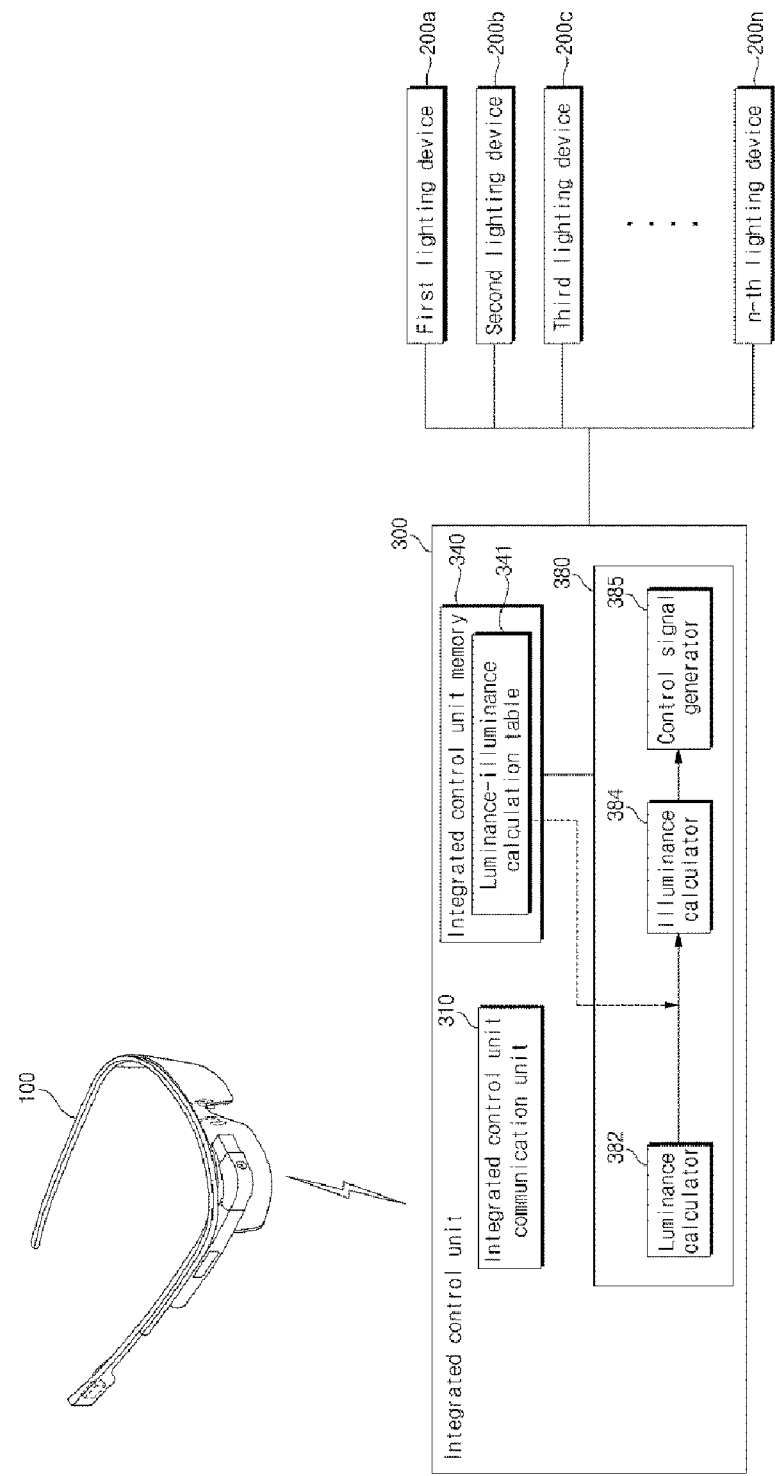
FIG. 10 is a block diagram of a lighting system according to a third embodiment of the present invention.

FIG. 10 is a block diagram of a lighting system according to a third embodiment of the present invention.

Referring to FIG. 10, the lighting system according to the third embodiment of the present invention includes the device 100, an integrated control unit 300 and a plurality of lighting devices 200a, 200b, . . . , 200n.

Redundant description of the device 100 and the lighting devices 200a, 200b, . . . , 200n with reference to FIGS. 2 to 8B is omitted.

The device 100 communicates with the integrated control unit 300. The device 100 and the integrated control unit 300 enter a second mode while the device 100 and the integrated control unit 300 are connected for communication. The second mode may be a mode for controlling the plurality of lighting devices 200a, 200b, . . . , 200n on the basis of an illuminance value calculated on the basis of an image.

In the second mode, the device 100 photographs an image of a space using the camera 160. Here, the image may be a still image or a moving image. Upon acquisition of the image of the space, the device 100 transmits the image to the integrated control unit 300 through the device radio communication unit 110.

A description will be given of operations according to components included in the integrated control unit 300.

The integrated control unit 300 includes an integrated control unit communication unit 310, an integrated control unit memory 340 and an integrated control unit controller 380.

The integrated control unit communication unit 310 communicates with the device 100 or the plurality of lighting devices 200 (200a to 200n).

The integrated control unit communication unit 310 may communicate with the device 100 using Bluetooth.

The integrated control unit communication unit 310 may use communication schemes such as Wi-Fi Direct, RFID (Radio Frequency Identification), IrDA (Infrared Data Association), UWB (Ultra Wideband), ZigBee and NFC (Near Field Communication) in addition to Bluetooth.

The integrated control unit communication unit 310 may include an RF circuit. The integrated control unit communication unit 310 may transmit and receive RF signals that are electromagnetic signals. The RF circuit may perform conversion between an electric signal and an electromagnetic signal and communicate with the device 100 through a converted electromagnetic signal.

For example, the RF circuit can include an antenna system, an RF transceiver, one or more amplifiers, a tuner, one or more oscillators, a digital signal processor, a codec chipset and a memory. The RF circuit may include a known circuit for executing a communication function.

The integrated control unit communication unit 310 may receive information sensed by the sensing unit 130 included in the device 100 by communicating with the device 100. For example, the integrated control unit communication unit 310 can receive illuminance information of the surrounding environment, sensed by the illumination sensor 131, from the device 100.

The integrated control unit communication unit 310 may receive image data acquired through the camera 160 from the device 100. For example, the integrated control unit communication unit 310 can receive at least one image of the space, acquired through the camera 160.

The integrated control unit memory 340 may store data and commands for operation of the integrated control unit 300.

The integrated control unit memory 340 may store data received from the device 100. For example, the integrated control unit memory 340 can store at least one image received from the device 100. Otherwise, the integrated control unit memory 340 may store a control signal received from the device 100.

The integrated control unit memory 340 may store predetermined PIN information of the device 100, which is used for communication security.

The integrated control unit memory 340 may include at least a non-volatile memory such as magnetic disk storage, a flash memory device and other non-volatile solid-state memory devices. However, the integrated control unit memory 340 is not limited thereto and may include a readable storage medium.

For example, the integrated control unit memory 340 can include an electronically erasable and programmable read only memory (EEPROM). Information can be written/erased into/from the EEPROM according to the controller 280 during operation of the controller 280. The EEPROM is a memory device in which information stored therein is maintained without being erased even when power is not supplied thereto.

The integrated control unit memory 340 may include a luminance-illuminance calculation table 341. Here, the luminance-illuminance calculation table 341 is reference data which is determined such that an illuminance value corresponding to an extracted average luminance value can be extracted. The luminance-illuminance calculation table 341 may be determined through tests.

The integrated control unit memory 340 stores a reference value. The reference value may refer to an illuminance reference value which is compared with a calculated illuminance value and used to control the plurality of lighting devices 200a, 200b, . . . , 200n. The reference value may be received from the device 100 through the integrated control unit radio communication unit 310. That is, the user can set the illuminance reference value through the device 100 and the set illuminance reference value can be transmitted to the integrated control unit 300 through communication.

The integrated control unit controller 380 receives data from the integrated control unit communication unit 310. The integrated control unit controller 380 controls the plurality of lighting devices 200a, 200b, . . . , 200n on the basis of the received data.

The integrated control unit controller 380 may control the plurality of lighting devices 200a, 200b, . . . , 200n on the basis of an illuminance value calculated based on a received image.

Specifically, a luminance calculator 382 measures individual luminance values of pixels included in an image of a space through image analysis. The luminance calculator 382 calculates an average luminance value on the basis of the individual luminance values of the pixels, measured from the image. The luminance calculator 382 may calculate the average luminance value by measuring individual luminance values of all pixels included in the image, summing the individual luminance values and dividing the sum by the total number of pixels. Alternatively, the luminance calculator 382 may calculate the average luminance value by selecting arbitrary pixels from among all pixels included in the image, measuring individual luminance values of the selected pixels, summing the individual luminance values and dividing the sum by the number of selected pixels. Alternatively, the luminance calculator 382 may calculate the average luminance value by dividing the image into a plurality of mosaic regions each having a predetermined size using a pixelate-mosaic filter, measuring luminance values of the mosaic regions and averaging the luminance values.

When the image is a moving image, the luminance calculator 382 may measure individual luminance values of respective pixels, on the basis of at least one frame of the moving image. The luminance calculator 382 may calculate the average luminance value on the basis of the individual luminance values.

An illuminance calculator 384 calculates an illuminance value corresponding to the average luminance value on the basis of the average luminance value calculated by the luminance calculator 382. The illuminance calculator 384 may calculate the illuminance value corresponding to the average luminance value by comparing the luminance-illuminance calculation table 341 included in the integrated control unit memory 340 with the average luminance value. Here, the luminance-illuminance calculation table 341 is reference data which is determined such that an illuminance value corresponding to an extracted average luminance value can be extracted. The luminance-illuminance calculation table 341 may be determined through tests.

A control signal generator 385 generates a control signal for controlling the plurality of lighting devices 200a, 200*b*, . . . , 200*n* on the basis of the illuminance value calculated by the illuminance calculator 384.

When the calculated illuminance value is greater than the reference value stored in the integrated control unit memory 340, the control signal generator 385 can generate a control signal for reducing the brightness of light provided to the space and output the control signal. In this case, the control signal generator 385 may generate a control signal for providing no light to the space and output the control signal.

When the calculated illuminance value is less than the reference value stored in the integrated control unit memory 340, the control signal generator 385 can generate a control signal for increasing the brightness of light provided to the space and output the control signal.

When the image is a moving image, the integrated control unit controller 380 may measure individual luminance values of pixels, calculate the average luminance value on the basis of the individual luminance values and control the plurality of lighting devices 200*a*, 200*b*, . . . , 200*n* according to an illuminance value corresponding to the average luminance value, on the basis of at least one frame of the moving image.

The integrated control unit controller 380 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electrical units for executing other functions.

Each of the plurality of lighting devices 200*a*, 200*b*, . . . , 200*n* may have a unique ID.

The integrated control unit controller 380 may respectively control the plurality of lighting devices 200*a*, 200*b*, . . . , 200*n* on the basis of the IDs respectively allocated to the plurality of lighting devices 200*a*, 200*b*, . . . , 200*n*.

For example, the integrated control unit controller 380 can acquire first ID information on the basis of feature points detected from an image. The integrated control unit controller 380 can control the first lighting device 200*a* corresponding to the first ID information.

For example, the integrated control unit controller 380 can receive the first ID information from the device 100. The integrated control unit controller 380 can control the first lighting device 200*a* corresponding to the first ID information. Here, the first ID information may be acquired on the basis of a flicker frequency of the first lighting device 200*a*. That is, the ID information of the first lighting device 200*a* can be transmitted to the device 100 through optical communication. The first lighting device 200*a* can signal the first ID information thereof through flicking that is not recognized by human eyes. In this case, the device 100 may receive the first ID information from the first lighting device 200*a* located in a space in a user's line of sight. The device 100 may transmit the first ID information to the integrated control unit 300.

Figure 11:
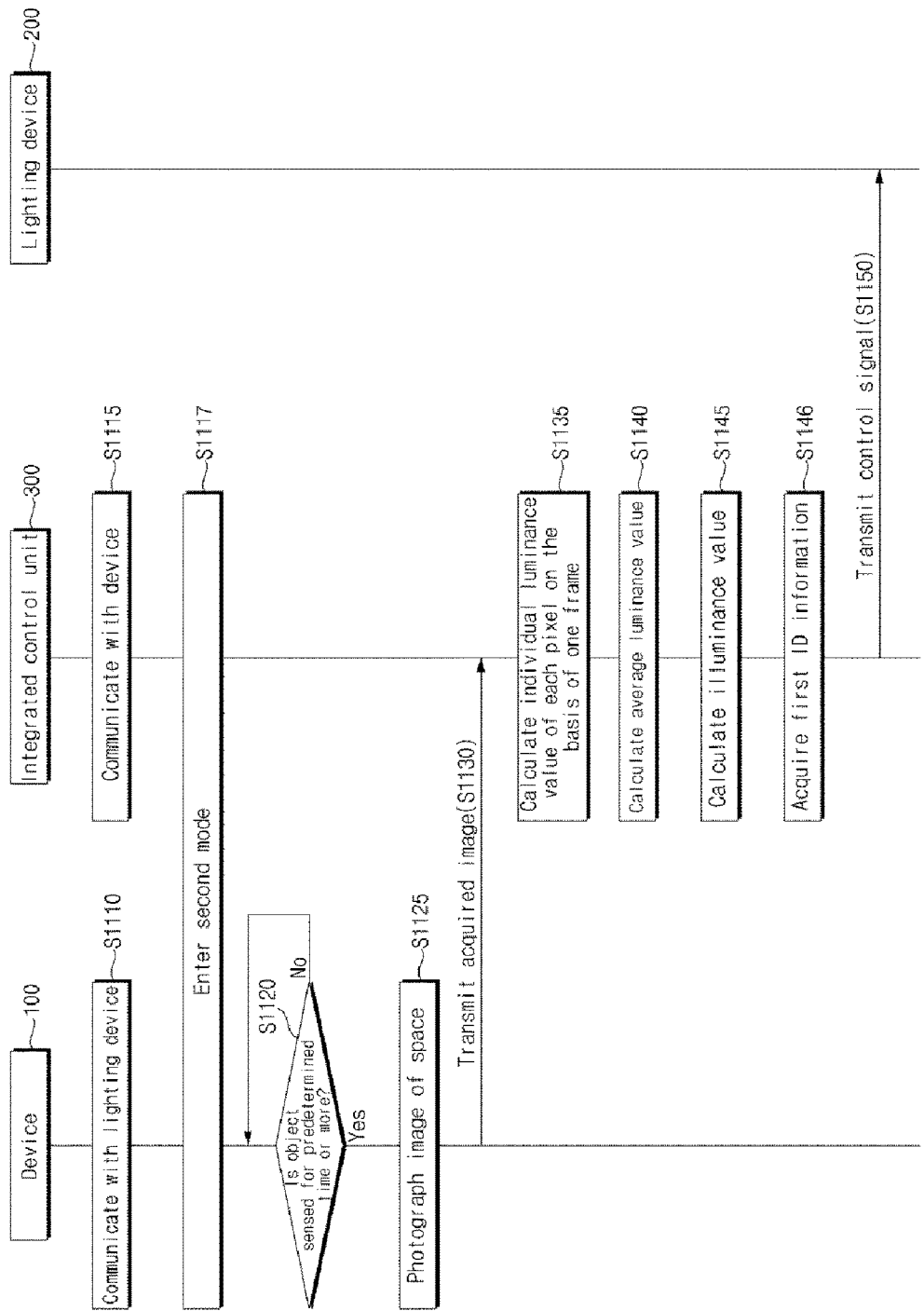
FIG. 11 is a signal flow of the lighting system according to the third embodiment of the present invention.

FIG. 11 is a signal flow of the lighting system according to the third embodiment of the present invention.

Referring to FIG. 11, the device 100 generates a communication channel with the integrated control unit 300. That is, the device 100 is connected to the integrated control unit 300 for communication (S1110 and S1115).

The device 100 enters the second mode while being connected to the integrated control unit 300 for communication (S1117). Otherwise, the integrated control unit 300 enters the second mode. The second mode may be a mode for controlling the plurality of lighting devices 200*a*, 200*b*, . . . , 200*n* on the basis of an illuminance value calculated on the basis of an image. The device 100 may receive input for entering the second mode through the device input unit 120. The integrated control unit 300 may receive the input for entering the second mode from the device 100 through the integrated control unit communication unit 310.

In the second mode, the device 100 determines whether an object is sensed for a predetermined time or longer, through the camera 160 (S1120). That is, when the user gazes at a predetermined space for a predetermined time, the device 100 can sense the space for the predetermined time or longer, through the camera 160.

When the object is sensed for the predetermined time or longer, the device 100 captures an image of the space through the camera 160 (S1125). Here, the image may be a still image or a moving image.

Upon acquisition of the image of the space, the device 100 transmits the image to the integrated control unit 300 through the device radio communication unit 110 (S1130). The integrated control unit 300 receives the image from the device 100 through the integrated control unit communication unit 310.

Upon reception of the image, the integrated control unit 300 measures individual luminance values of pixels included in the image of the space through image analysis (S1135). Then, the integrated control unit 300 calculates an average luminance value on the basis of the individual luminance values of the pixels, measured from the image (S1140). Subsequently, the integrated control unit 300 calculates an illuminance value corresponding to the average luminance value on the basis of the calculated average luminance value (S1145).

The first ID information is acquired (S1146). For example, the integrated control unit 300 can acquire the first ID information on the basis of feature points detected from the image. For example, the integrated control unit 300 can acquire the first ID information from the device 100.

Then, the integrated control unit 300 transmits a control signal for controlling the first lighting device 200*a* corresponding to the first ID information on the basis of the calculated illuminance value (S1150).

Specifically, upon calculation of the illuminance value, the integrated control unit 300 compares the illuminance value with the reference value. The integrated control unit 300 controls the first lighting device 200*a* on the basis of the result of comparison between the illuminance value and the reference value.

When the illuminance value is equal to the reference value, the integrated control unit 300 controls the first lighting device 200*a* to maintain the brightness of light provided to the space.

When the illuminance value is greater than the reference value, the integrated control unit 300 controls the first lighting device 200*a* to reduce the brightness of light provided to the space or not to provide light to the space.

When the illuminance value is less than the reference value, the integrated control unit 300 controls the first lighting device 200*a* to increase the brightness of light provided to the space.

Figure 12:
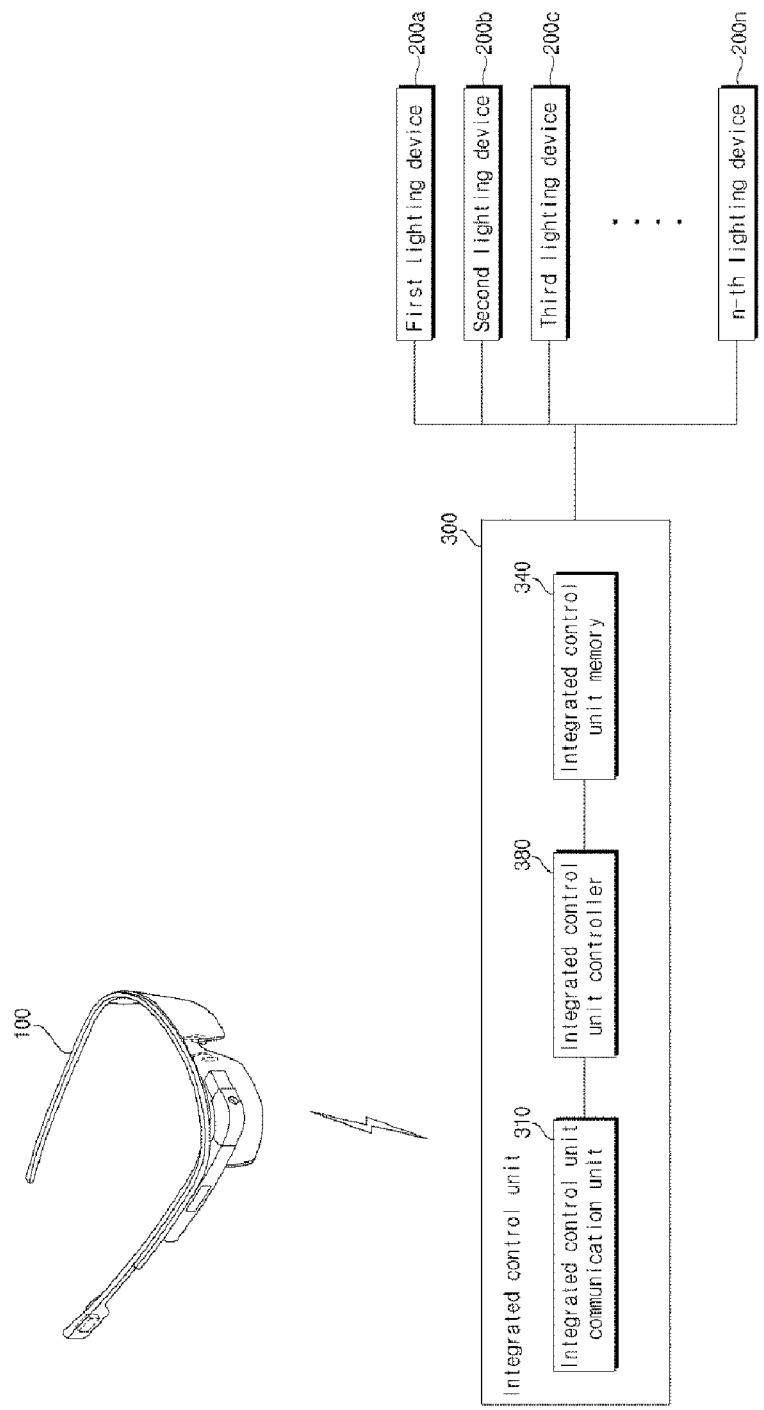
FIG. 12 is a block diagram of a lighting system according to a fourth embodiment of the present invention.

FIG. 12 is a block diagram of a lighting system according to a fourth embodiment of the present invention.

The fourth embodiment differs from the third embodiment in terms of the configuration of the integrated control unit controller 380.

A description will be given of the lighting system according to the fourth embodiment of the present invention on the basis of the difference between the fourth embodiment and the third embodiment.

Referring to FIG. 12, the lighting system according to the fourth embodiment of the present invention includes the device 100, the integrated control unit 300 and the plurality of lighting devices 200a, 200b, . . . , 200n.

Redundant description of the device 100, the integrated control unit 300 and the lighting devices 200a, 200b, . . . , 200n with reference to FIGS. 2 to 8B is omitted.

The device 100 communicates with the integrated control unit 300. The device 100 and the integrated control unit 300 enter the second mode while the device 100 and the integrated control unit 300 are connected for communication.

In the second mode, the device 100 acquires an image of a space by photographing the image using the camera 160.

Upon acquisition of the image, the device 100 measures individual luminance values of pixels included in the image of the space through image analysis.

Upon measurement of the individual luminance values, the device 100 calculates an average luminance value on the basis of the individual luminance values of the pixels, measured from the image.

Upon calculation of the average luminance value, the device 100 calculates an illuminance value corresponding to the average luminance value on the basis of the calculated average luminance value.

Upon calculation of the illuminance value, the device 100 compares the illuminance value with the reference value. The device 100 generates a radio control signal on the basis of the result of comparison between the illuminance value and the reference value.

When the illuminance value is equal to the reference value, the device 100 generates a radio control signal for maintaining the brightness of light provided to the space.

When the illuminance value is greater than the reference value, the device 100 generates a radio control signal for reducing the brightness of light provided to the space or for providing no light to the space.

When the illuminance value is less than the reference value, the device 100 generate a radio control signal for increasing the brightness of light provided to the space.

The device 100 transmits the radio control signal to the integrated control unit 300 through the device radio communication unit 110.

The integrated control unit 300 includes the integrated control unit communication unit 310, the integrated control unit memory 340 and the integrated control unit controller 380.

The integrated control unit communication unit 310 communicates with the device 100 or the plurality of lighting devices 200 (200a to 200n). The integrated control unit communication unit 310 receives a radio control signal transmitted from the device 100.

The integrated control unit communication unit 310 controls the plurality of lighting devices 200a, 200b, . . . , 200n on the basis of the received radio control signal. Here, the radio control signal may be based on the illuminance value corresponding to the average luminance value which is calculated on the basis of the individual luminance values of the pixels included in the acquired image of the space.

The plurality of lighting devices 200a, 200b, . . . , 200n respectively have unique IDs.

The integrated control unit 300 may respectively control the plurality of lighting devices 200a, 200b, . . . , 200n on the basis of the IDs allocated to the lighting devices 200a, 200b, . . . , 200n.

For example, the integrated control unit controller 380 can receive the first ID information from the device 100. The integrated control unit controller 380 can control the first lighting device 200a corresponding to the first ID information. The first ID information may be acquired by the device 100 on the basis of feature points of the first lighting device, which are indicated on the image, or the flicker frequency of the first lighting device.

Figure 13:
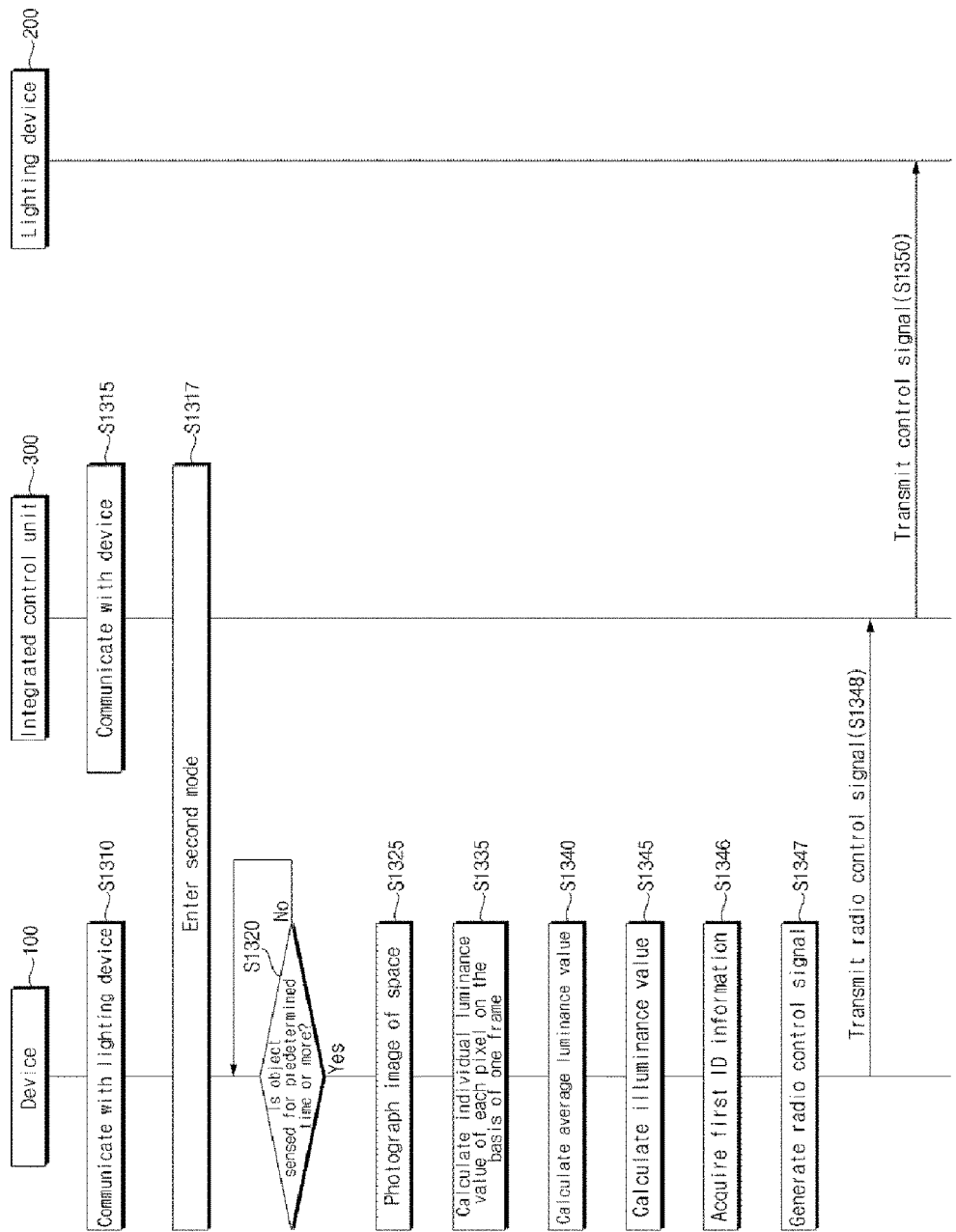
FIG. 13 is a signal flow of the lighting system according to the fourth embodiment of the present invention.

FIG. 13 is a signal flow of the lighting system according to the fourth embodiment of the present invention.

A description will be given of operation of the lighting system according to the fourth embodiment of the present invention on the basis of a difference between the first embodiment and the fourth embodiment.

The device 100 generates a communication channel with the integrated control unit 300. That is, the device 100 is connected to the integrated control unit 300 for communication (S1310 and S1315).

The device 100 enters the second mode while being connected to the integrated control unit 300 for communication (S1317). Otherwise, the integrated control unit 300 enters the second mode.

In the second mode, the device 100 determines whether an object is sensed for a predetermined time or longer, through the camera 160 (S1320).

When the object is sensed for the predetermined time or longer, the device 100 acquires an image of the object by photographing the image using the camera 160 (S1325). Upon acquisition of the image, the device 100 measures individual luminance values of pixels included in the image of the space through image analysis (S1335). Then, the device 100 calculates an average luminance value on the basis of the individual luminance values of the pixels, measured from the image (S1340). Subsequently, the device 100 calculates an illuminance value corresponding to the average luminance value on the basis of the calculated average luminance value (S1345).

The device 100 acquires the first ID information corresponding to the first lighting device 200a (S1346). Here, the first lighting device 200a may be a lighting device located in the space in the user's line of sight. The device 100 may acquire the first ID information on the basis of feature points of the first lighting device, indicated on the image, or the flicker frequency of the first lighting device.

The device 100 generates a radio control signal for controlling the first lighting device 200a on the basis of the illuminance value (S1347).

Specifically, upon calculation of the illuminance value, the device 100 compares the illuminance value with the reference value. The device 100 generates a radio control signal on the basis of the result of comparison between the illuminance value and the reference value.

When the illuminance value is equal to the reference value, the device 100 generates a radio control signal for maintaining the brightness of light provided to the space.

When the illuminance value is greater than the reference value, the device 100 generates a radio control signal for reducing the brightness of light provided to the space or providing no light to the space.

When the illuminance value is less than the reference value, the device 100 generates a radio control signal for increasing the brightness of light provided to the space.

The device 100 transmits the generated radio control signal to the integrated control unit 300 through the device radio communication unit 110 (S1348).

The integrated control unit 300 transmits a control signal for controlling the first lighting device 200a corresponding to the first ID to the first lighting device 200a on the basis of the calculated illuminance value (S1350).

Figure 14B:
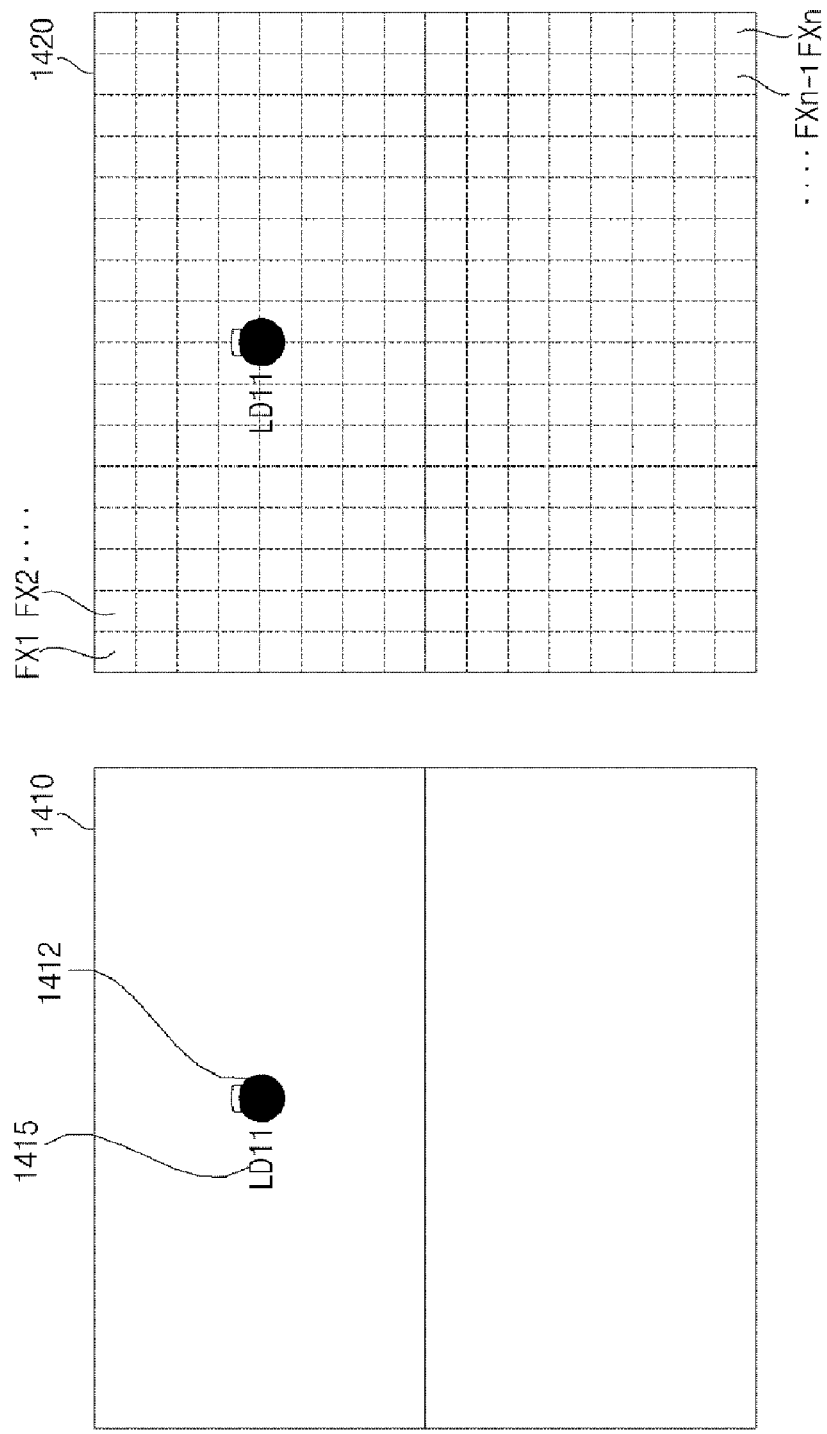

FIGS. 14A and 14B are views for explaining operations of the lighting systems according to the third and fourth embodiments of the present invention.

Description will be given of operation of the lighting system according to the third embodiment with reference to FIGS. 14A and 14B. The integrated control unit 300 communicates with the device 100. The integrated control unit 300 enters the second mode while being connected to the device 100 for communication. In the second mode, the integrated control unit 300 receives an image from the device 100 through the radio communication unit 310. Here, the image may be an image acquired through the camera 160 included in the device 100. Further, the image may be an image of a space 1400 in the user's line of sight. The image may be a still image or a moving image.

In FIG. 14B, reference numerals 1410 and 1420 indicate an image acquired through the camera 160 included in the device 100.

Upon reception of the image, the integrated control unit 300 measures individual luminance values of pixels PX1, PX2, . . . , FXn included in the image 1420 of the space through image analysis. The integrated control unit 300 calculates an average luminance value on the basis of the individual luminance values. The integrated control unit 300 may calculate the average luminance value by measuring individual luminance values of all pixels PX1, PX2, . . . , FXn included in the image, summing the individual luminance values and dividing the sum by the total number of pixels. Alternatively, the integrated control unit 300 may calculate the average luminance value by selecting arbitrary pixels (e.g. PX10, FX20, . . . FX10n) from among all pixels included in the image, measuring individual luminance values of the selected pixels, summing the individual luminance values and dividing the sum by the number of selected pixels.

The integrated control unit 300 calculates an illuminance value corresponding to the average luminance value on the basis of the calculated average luminance value. The integrated control unit 300 may calculate the illuminance value corresponding to the average luminance value by comparing the luminance-illuminance calculation table 341 included in the integrated control unit memory 340 with the average luminance value. Here, the luminance-illuminance calculation table 341 is reference data which is determined such that an illuminance value corresponding to an extracted average luminance value can be extracted. The luminance-illuminance calculation table 341 may be determined through testing.

The integrated control unit 300 acquires the first ID information. For example, the integrated control unit 300 can acquire the first ID information on the basis of feature points 1415 detected from the image. For example, the integrated control unit 300 can receive the first ID information from the device 100.

The integrated control unit 300 transmits a control signal for controlling the first lighting device 200a corresponding to the first ID on the basis of the calculated illuminance value.

Specifically, upon calculation of the illuminance value, the integrated control unit 300 compares the illuminance value with the reference value. The integrated control unit 300 controls the first lighting device 200a on the basis of the result of comparison between the illuminance value and the reference value.

When the illuminance value is equal to the reference value, the integrated control unit 300 controls the first lighting device 200a to maintain brightness of light provided to the space.

When the illuminance value is greater than the reference value, the integrated control unit 300 controls the first lighting device 200a to reduce brightness of light provided to the space or not to provide light to the space.

When the illuminance value is less than the reference value, the integrated control unit 300 controls the first lighting device 200a to increase brightness of light provided to the space.

A description will be given of operation of the lighting system according to the fourth embodiment with reference to FIGS. 14A and 14B. The integrated control unit 300 communicates with the device 100. The integrated control unit 300 enters the second mode while being connected to the device 100 for communication. In the second mode, the device 100 acquires an image 1410 of the space 1400 by photographing the image through the camera 160.

Upon acquisition of the image 1410, the device 100 measures individual luminance values of pixels PX1, PX2, . . . , FXn included in the image 1410 of the space 1400 through image analysis. The device 100 calculates an average luminance value on the basis of the individual luminance values.

The device 100 calculates an illuminance value corresponding to the average luminance value on the basis of the calculated average luminance value.

The device 100 acquires the first ID information corresponding to the first lighting device 200a. Here, the first lighting device 200a may be a lighting device located in a space in the user's line of sight. The device 100 can acquire the first ID information on the basis of feature points of the first lighting device, which are indicated on the image, or the flicker frequency of the first lighting device.

The device 100 generates a radio control signal for controlling the first lighting device 200a on the basis of the illuminance value.

Upon calculation of the illuminance value, the device 100 compares the illuminance value with the reference value. The device 100 can generate the radio control signal on the basis of the result of comparison between the illuminance value and the reference value.

When the illuminance value is equal to the reference value, the device 100 generates a radio control signal for maintaining brightness of light provided to the space.

When the illuminance value is greater than the reference value, the device 100 generates a radio control signal for reducing brightness of light provided to the space or for providing no light to the space.

When the illuminance value is less than the reference value, the device 100 generates a radio control signal for increasing brightness of light provided to the space.

The device 100 transmits the radio control signal to the integrated control unit 300 through the device radio communication unit 110.

The integrated control unit 300 transmits, to the first lighting device 200a, a control signal for controlling the first lighting device 200a corresponding to the first ID on the basis of the calculated illuminance value.

The present invention may be implemented as code that can be written to a processor-readable recording medium included in a mobile terminal and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave, e.g., data transmission over the Internet. The processor-readable recording medium may be distributed over a plurality of computer systems connected to a network so that processor-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lighting device, comprising:
   a radio that communicates with at least one device to receive an image of a space from the at least one device;
   a light assembly including at least one first light-emitting element providing light to the space; and
   a controller that controls the light assembly based on an illuminance value calculated based on the image,
   wherein the at least one device is a glasses-type wearable device worn by a user, and the space is in a line of sight viewed by the user for at least a threshold length of time.

2. The lighting device of claim 1, wherein the controller measures individual luminance values of pixels included in the image, calculates an average luminance value based on the individual luminance values, and determines the illuminance value for controlling the light assembly based on to the average luminance value.

3. The lighting device of claim 1, wherein the controller includes an image processor that processes the image to determine the illuminance value.

4. The lighting device of claim 3, wherein the image processor comprises:
   a luminance calculator that measures the individual luminance values of the pixels included in the image and calculates an average luminance value based on the individual luminance values;
   an illuminance calculator that determines the illuminance value corresponding to the average luminance value; and
   a control signal generator that generates a control signal for controlling the light assembly based on the illuminance value.

5. The lighting device of claim 1, further comprising a memory storing a reference value,
   wherein the controller compares the illuminance value with the reference value, controls the light assembly to reduce the brightness of light provided to the space or not to provide light to the space when the illuminance value is greater than the reference value, and controls the light assembly to increase the brightness of light provided to the space when the illuminance value is less than the reference value.

6. The lighting device of claim 5, wherein the reference value is received from the at least one device through the radio.

7. The lighting device of claim 1, further comprising a memory storing a luminance-illuminance calculation table,
   wherein the controller uses the luminance-illuminance calculation table to calculate the illuminance value corresponding to an average luminance value associated with the image and controls the light assembly based on the illuminance value.

8. The lighting device of claim 1, wherein the radio transmits, to the at least one device, data corresponding to an average luminance value or the illuminance value.

9. A lighting device, comprising:
   a radio that communicates with at least one device to receive a radio control signal from the at least one device;
   a light assembly including a plurality of light-emitting elements; and
   a controller that controls the light assembly based on the radio control signal,
   wherein the radio control signal is based on an illuminance value calculated from an image of a space, generated in the at least one device,
   wherein the at least one device is a glasses-type wearable device worn by a user, and the space is in a line of sight viewed by the user through the device for at least a threshold length of time; and
   wherein the light assembly provides light to the space.

10. The lighting device of claim 9, wherein the illuminance value corresponds to an average luminance value calculated based on individual luminance values of pixels included in the image.

11. The lighting device of claim 8, wherein the at least one device includes an image processor for processing the image to determine the illuminance value.

12. The lighting device of claim 11, wherein the image processor comprises:
    a luminance calculator that measures individual luminance values of the pixels included in the image and calculates an average luminance value based on the individual luminance values;
    an illuminance calculator that determines the illuminance value based on the average luminance value; and
    a control signal generator that generates a control command to control the light assembly based on the illuminance value.

13. The lighting device of claim 9, wherein the at least one device further includes a device memory that stores a reference value,
    wherein the at least one device compares the illuminance value with the reference value, and generates the radio control signal based on comparing the illuminance value with the reference value, and
    wherein the radio control signal causes the light assembly to reduce the brightness of light provided to the space or to stop providing light to the space when the illuminance value is greater than the reference value, and causes the light assembly to increase the brightness of light provided to the space when the illuminance value is less than the reference value.

14. The lighting device of claim 9, wherein the at least one device further includes a memory storing a luminance-illuminance calculation table,
    wherein the at least one device calculates the illuminance value corresponding to an average luminance value associated with the image through the luminance-illuminance calculation table and generates the radio control signal on the basis of the illuminance value.

15. The lighting device of claim 9, wherein the at least one device is includes at least one camera to capture the image.

16. The lighting device of claim 1, wherein an object is positioned in the line of sight, and wherein the at least one device captures the image based on sensing the object for the threshold length of time.

17. The lighting device of claim 1, wherein the light assembly has a plurality of light-emitting elements that include the at least one first light-emitting element providing light to the space and at least one second light-emitting element that does not provide light to the space, and wherein the controller, when controlling the light assembly based on the illuminance value, adjusts light from the at least one first light-emitting element and does not adjust light from the at least one second light-emitting element.

18. The lighting device of claim 17, wherein the controller processes the image to identify the at least one first light-emitting element.

19. The lighting device of claim 9, wherein an object is positioned in the line of sight, and wherein the at least one device captures the image based on detecting the object for the threshold length of time.

20. The lighting device of claim 9, wherein the plurality of light-emitting elements include a first light-emitting element providing light to the space and a second light-emitting element that does not provide light to the space, and wherein the controller, when controlling the light assembly, adjusts an output of the first light-emitting element without adjusting an output of the second light-emitting element.

21. The lighting device of claim 17, wherein the at least one device processes the image to identify the first light-emitting element, and wherein the control signal includes data identifying the first light-emitting element.

* * * * *